(12) United States Patent
Rice et al.

(10) Patent No.: US 9,200,985 B2
(45) Date of Patent: Dec. 1, 2015

(54) EVALUATING SPRINKLER HEAD PERFORMANCE WITHIN A TURF IRRIGATION SYSTEM

(75) Inventors: Kathleen Sue Rice, Faribault, MN (US); Van Willis Cline, St. Paul, MN (US)

(73) Assignee: The Toro Company, Bloomington, MN (US)

( * ) Notice: Subject to any disclaimer, the term of this patent is extended or adjusted under 35 U.S.C. 154(b) by 676 days.

(21) Appl. No.: 13/558,071

(22) Filed: Jul. 25, 2012

(65) Prior Publication Data

US 2013/0191073 A1      Jul. 25, 2013

Related U.S. Application Data

(60) Provisional application No. 61/511,728, filed on Jul. 26, 2011.

(51) Int. Cl.
*G06F 19/00* (2011.01)
*G01M 99/00* (2011.01)

(52) U.S. Cl.
CPC .................................. *G01M 99/008* (2013.01)

(58) Field of Classification Search
CPC .... A01G 25/16; A01G 25/167; G05D 7/0617
USPC .................................................. 702/182–185
See application file for complete search history.

(56) References Cited

U.S. PATENT DOCUMENTS

| 7,628,059 B1 | 12/2009 | Scherbring |
| 2002/0169558 A1 | 11/2002 | Smith et al. |
| 2012/0084115 A1 | 4/2012 | Cline et al. |

OTHER PUBLICATIONS

Scherbring, David J., U.S. Appl. No. 13/035,937 for Mobile Turf Instrument Apparatus Having Droppable Hammer Type Accelerometer Carried on Rotating Arm filed Feb. 26, 2011.
Australian Patent Office; Patent Examination Report No. 1 for Application No. 2012207035 dated Jul. 8, 2014, 6 pages.
Pair, Claude H., Water Distribution Under Sprinkler Irrigation, Transactions of the American Society of Agricultural Engineers, 1968, vol. 11, No. 5, pp. 648-651.
Dukes, Michael D. et al., Sprinkler Irrigation and Soil Moisture Uniformity, 27th Annual International Irrigation Show San Antonio, TX, Nov. 5-7, 2006, pp. 446-452.

*Primary Examiner* — Edward Raymond
(74) *Attorney, Agent, or Firm* — Merchant & Gould P.C.

(57) ABSTRACT

Systems and methods for evaluating individual sprinkler head performance within a turf irrigation system are disclosed.

20 Claims, 21 Drawing Sheets

EVALUATING SPRINKLER HEAD PERFORMANCE WITHIN A TURF IRRIGATION SYSTEM

CROSS REFERENCE TO RELATED APPLICATION

This application claims priority to U.S. Ser. No. 61/511,728, filed on Jul. 26, 2011, titled EVALUATING SPRINKLER HEAD PERFORMANCE WITHIN A TURF IRRIGATION SYSTEM, the disclosure of which is incorporated by reference herein in its entirety.

INTRODUCTION

Turf irrigation systems are often used to provide moisture to turf grass. Such irrigation systems typically supply water to individual sprinkler heads that are distributed about the turf site. The sprinkler heads spray the water onto adjacent portions of the turf grass. Preferably the sprinkler heads are arranged so that at least most of the turf site is within the range of one or more of the sprinkler heads.

When a sprinkler head is not performing properly, the turf grass surrounding that sprinkler head can be adversely affected. Identifying underperforming sprinkler heads can be difficult, however, especially when the irrigation system has a large number of sprinkler heads distributed across a large turf site.

SUMMARY

In general terms, this disclosure is directed to irrigation system auditing. In one possible configuration and by non-limiting example, the irrigation system auditing involves an evaluation of individual sprinkler head performance within a turf irrigation system.

One aspect is a method of evaluating irrigation system performance, the irrigation system including sprinkler heads, the method including: collecting data about a turf site, the data including soil moisture data, turf quality data, soil compaction data, and sprinkler head location data; generating a performance score for the individual sprinkler heads using a computing device, the performance score being based at least in part on the soil moisture data, turf quality data, and soil compaction data for a region of the turf site surrounding the respective sprinkler head; and identifying one or more of the sprinkler heads as potentially underperforming using the performance scores for the sprinkler heads.

Another aspect is a method of computing a performance of a sprinkler head, the method including: evaluating soil moisture uniformity in turf around the sprinkler head; evaluating turf quality of the turf around the sprinkler head; evaluating compaction of the turf around the sprinkler head; and determining a performance of the sprinkler head, using a computing device, based at least in part on the soil moisture uniformity, turf quality, and compaction.

Yet another aspect is a method of evaluating a performance of a sprinkler head, the method including: computing a soil moisture uniformity value, using a computing device, by evaluating a plurality of soil moisture values measured from a region of turf that is watered by the sprinkler head, wherein the moisture values represent a measurement of an amount of water in the soil at the time of the sampling; and generating a score representative of the performance of the sprinkler head using at least the soil moisture uniformity value.

A further aspect is a data processing lab, including: programmable electronics including at least one processing device and at least one computer readable storage medium, the at least one computer readable storage medium storing therein data instructions, which when executed by the at least one processing device cause the programmable electronics to: identify at least one location of a sprinkler head; evaluate at least one characteristic of a portion of a turf site surrounding the sprinkler head location using at least soil moisture data; and determine whether the at least one characteristic indicates that the sprinkler head is underperforming.

Yet another aspect is a method of evaluating a sprinkler head distribution pattern, the method including: identifying a portion of a turf site surrounding a sprinkler head; segmenting the portion into multiple concentric bands extending from a location of the sprinkler head; evaluating at least one characteristic of the turf site within each of the concentric bands using a computing device; and comparing the characteristics among the concentric bands.

DETAILED DESCRIPTION

Figure 1:
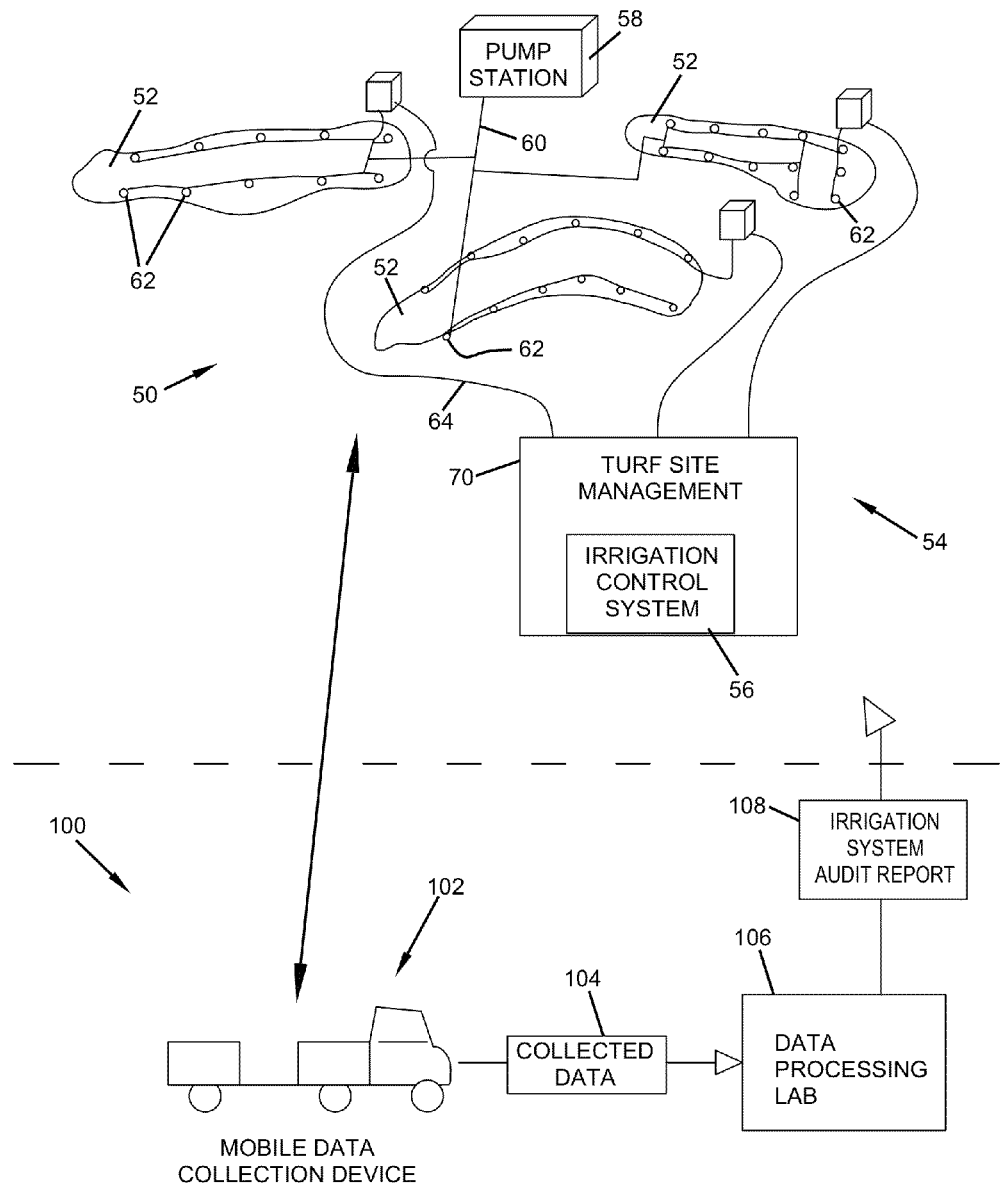
FIG. 1 is a schematic diagram of an example irrigation auditing system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic diagram of an example irrigation auditing system 100 for auditing a turf site 50.

The turf site 50 is a site having turf grass 52 managed by an irrigation system 54. Turf sites can take a variety of recreational and non-recreational forms. An example of a turf site 50 is a golf course, as illustrated in FIG. 1, such as including turf teeing grounds, fairways, roughs, and greens. Several other examples of a recreational turf site 50 include a baseball field, soccer field, football field, turf race track, and a park lawn. Several examples of a non-recreational turf site include a residential lawn, a commercial lawn, and a green roof.

The irrigation system 54 is installed at the turf site 50 to provide water to the turf grass 52. Irrigation system 54 typically includes an irrigation control system 56, a pump station 58, water delivery conduits 60, sprinkler heads 62, and control lines 64. A turf site management facility 70, such as including an office for a turf site manager (such as a golf course superintendent), may be present in some embodiments. The irrigation control system 56 typically includes a computing device, such as the exemplary computing device illustrated and described with reference to FIG. 5. Some irrigation control systems 56 include a central control system and multiple field control systems. The pump station 58 pumps water from a water source, such as a well, to supply the water to water delivery conduits 60 at a suitable pressure. The water delivery conduits 60 deliver the water from the pump station 58 to the sprinkler heads 62. Control lines 64 (or wireless control devices) transmit control signals from the irrigation control system 56 to the sprinkler heads 62. Valves in the sprinkler heads 62 are selectively opened or closed based on the control signals. When opened, the sprinkler heads 62 sprays the water onto the surrounding turf grass 52.

Some irrigation systems 54 have a large number of sprinkler heads 62, such as hundreds of sprinkler heads, which can be distributed over a large turf site 50. It is difficult and labor intensive to manually inspect the performance of such a large number of sprinkler heads 62, such as by visually inspecting the operation of sprinkler heads 62 or otherwise manually inspecting performance of the sprinkler heads 62. Even if sprinkler heads 62 appear to be working properly, the sprinkler heads 62 may actually have an undesirable non-uniform spray pattern that is difficult to detect by visual inspection, which can adversely affect the quality of the turf grass or require that the irrigation system over water other areas in order to compensate for the non-uniform spray pattern.

The irrigation auditing system 100 is a system that can evaluate the performance of an irrigation system 54 at a turf site 50. In some embodiments, the system 100 evaluates the performance of individual sprinkler heads 62 of an irrigation system 54, such as to identify sprinkler heads 62 exhibiting one or more undesirable characteristics.

In this example, the irrigation auditing system 100 includes a data collection vehicle 102 that collects data 104, and a data processing lab 106 that processes the data and generates an irrigation system audit report 108. In some embodiments, the irrigation system audit report 108 is then provided to a turf site manager, who can utilize the information to identify changes that could be made to the irrigation system 54 to improve the performance of the irrigation system 54.

The data collection vehicle 102 is illustrated and described in more detail with reference to FIG. 2. Preferably data collection vehicle 102 is used to evaluate a turf site after a period in which little or no rain has fallen, and during which the irrigation system 54 was operational. For example, a dry period of 1-2 weeks is preferred. By performing the evaluation after a dry period, the measurements will primarily represent the influence of the irrigation system 54 on the turf site, rather than the effects of the rain.

The collected data 104 is illustrated and described in more detail with reference to FIG. 3.

The data processing lab 106 is illustrated and described in more detail with reference to FIGS. 4-18.

An exemplary irrigation system audit report 108 is illustrated and described in more detail with reference to FIGS. 19-21.

Figure 2:
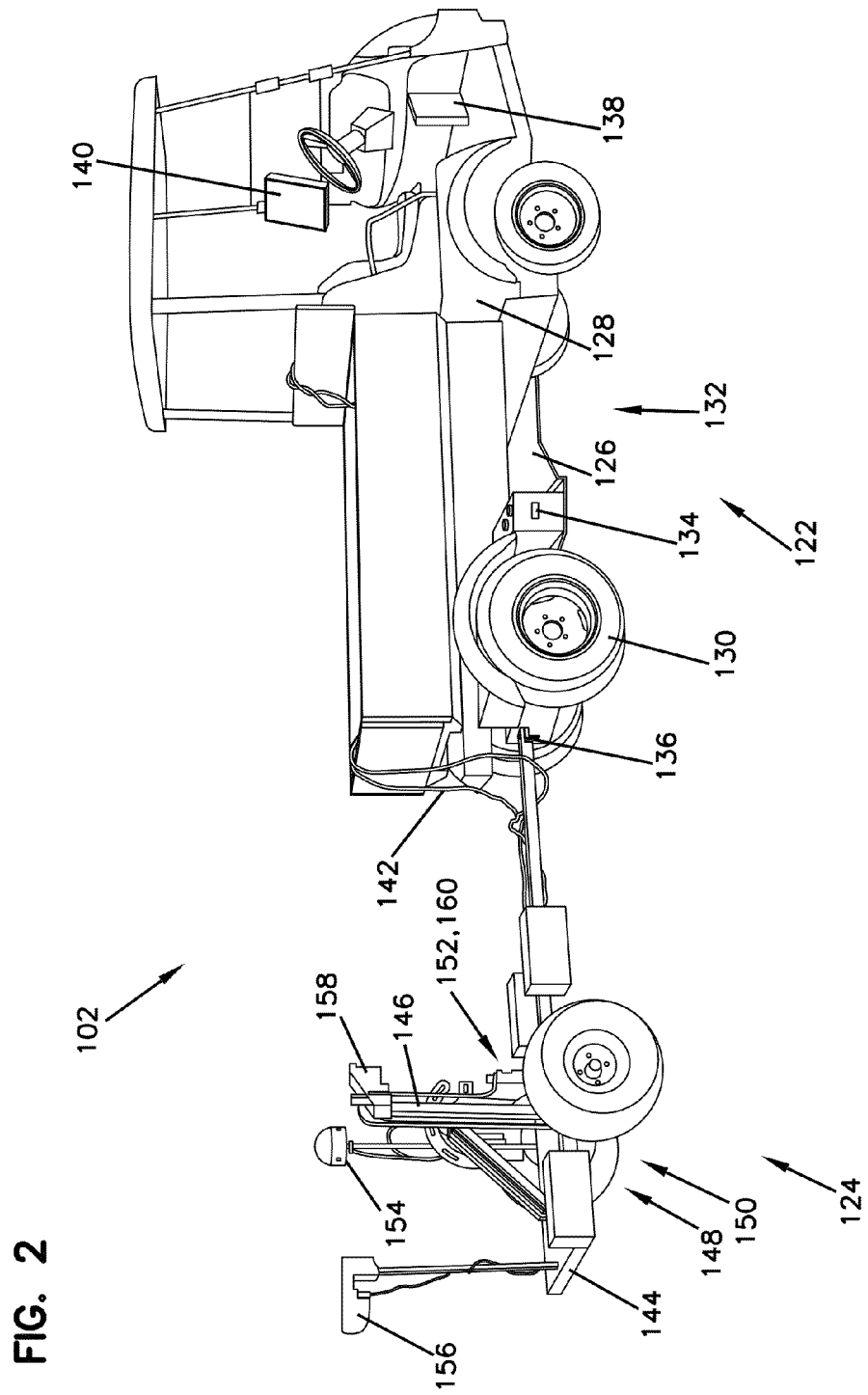
FIG. 2 is a perspective side view of an example mobile data collection device of the irrigation auditing system shown in FIG. 1.

FIG. 2 is a perspective side view of an example mobile data collection device 102 for collecting data about a turf site 50. In this example, mobile data collection device 102 includes a data collection vehicle 122 and a mobile turf instrument apparatus 124.

Data collection vehicle 122 is a motorized vehicle that propels the mobile turf instrument apparatus 124. Although illustrated as a separate vehicle, in some embodiments the data collection vehicle 122 and mobile turf instrument apparatus 124 is a single device.

In this example, data collection vehicle 122 includes frame 126, body 128, wheels 130, motor 132, power source 134, a trailer hitch 136, a computing device 138, display device 140, and electrical wiring 142. The data collection vehicle 122 may be powered by any of a variety of power sources 134, such as gasoline or electricity from a battery. Wheels 130 are preferably of a larger width to distribute the weight of the data collection vehicle about a larger area of turf grass 52 (shown in FIG. 1), to reduce compaction of the soil.

Trailer hitch 136 is connected to the frame 126 of data collection vehicle 122 to permit a tongue of the mobile turf instrument apparatus 124 to be removably coupled to the data collection vehicle 122.

In this example, a computing device 138 and display device 140 are provided on data collection vehicle 122 to receive and store data collected by mobile turf instrument apparatus 124. In some embodiments, the computing device 138 displays a graphical user interface on display device 140, which displays a map of turf site 50. For example, the map is annotated with lines indicating where the data collection vehicle 122 has already gone, to assist the driver of the data collection vehicle 122 in proceeding along the appropriate data collection path. In another possible embodiment, the path is physically marked, such as with flags, foam markers, paint, chalk, or other markers.

Electrical wiring 142 connect between the mobile turf instrument apparatus 124 and computing device 138 to transfer data from the mobile turf instrument apparatus 124 to the computing device 138 where the data is stored in memory.

Mobile turf instrument apparatus 124 is coupled to data collection vehicle 122 and operates to take measurements of the turf grass 52 as it is moved across the surface of the turf grass 52. An example of a mobile turf instrument apparatus is described in U.S. Pat. No. 7,628,059 titled MOBILE TURF INSTRUMENT APPARATUS HAVING DRIVEN, PERIODICALLY INSERTABLE, GROUND PENETRATING PROBE ASSEMBLY, issued on Dec. 8, 2009; and in U.S. Ser. No. 13/035,937, titled MOBILE TURF INSTRUMENT APPARATUS HAVING DROPPABLE HAMMER TYPE ACCELEROMETER CARRIED ON ROTATING ARM, filed on Feb. 26, 2011.

In the example illustrated in FIG. 2, mobile turf instrument apparatus 124 includes a wheeled frame 144, elongated revolving arm 146, a soil moisture sensor package 148, ground penetrating probes 150, weights 152, global positioning system (GPS) device 154, spectrometer 156, compaction sensor 158, and salinity sensor 160.

Elongated revolving arm 146 is coupled to wheeled frame 144, and positioned within an open central space of wheeled frame 144. The elongated revolving arm 146 is revolved by a drive taken from one wheel of wheeled frame 144 to move elongated revolving arm 146 in a revolving motion.

Ground penetrating probes 150 extend from a lower end of elongated revolving arm 146 toward turf grass 52 (shown in FIG. 2). Weights 152 are coupled to the elongated revolving arm. When the elongated revolving arm 146 reaches a forward position, the elongated revolving arm is released and the weights 152 apply a force to the ground penetrating probes 150 to cause them to be inserted into turf grass 52. The elongated revolving arm 146 is allowed to pivot as the data collection vehicle 122 and mobile turf instrument apparatus 124 continue to move forward, to allow the ground penetrating probes 150 to remain in turf grass 52 for a period of time.

While the ground penetrating probes 150 are in the ground, the soil moisture sensor package 148 generates electrical signals at the ground penetrating probes 150. One or more measurements are then taken to evaluate a quality of the turf at that location, such as to determine the volumetric water content of the turf grass 52. In some embodiments, salinity sensor 160 is also coupled to the ground penetrating probes 150, which generates signals to measure the salinity of the soil at that location. Some embodiments further include a temperature sensor for measuring canopy temperature. Some embodiments further include a compaction sensor 158 (e.g., a compaction penetrometer or load cell) for determining the compaction of the soil at that location.

Some embodiments further include a spectrometer 156. In some embodiments, spectrometer 156 is a near infrared spectrometer sensor. In some embodiments the spectrometer 156 operates to measure the amount of photosynthetically active energy (red and blue light) absorbed by the turf canopy as an indication of photosynthesis and plant vigor. The spectrometer 156, in some embodiments, emits energy in the red and near-infrared portions of the spectrum, and measures the amount reflected by the canopy. The spectrometer 156 then calculates a normalized ratio of the two called Normalized Difference Vegetative Index (NDVI). In some embodiments the NDVI varies from 0 to 1, where the higher the NDVI value, the more vigorous the turf. The NDVI measurement is responsive to physiological changes in turf plants caused by factors such as moisture stress, nutrient deficiency or disease or insect damage which are frequently short-term in nature. Since photosynthesis is a natural process, its intensity can change with time of day and microclimatic conditions which can in turn affect NDVI values. NDVI is also responsive to turf canopy architecture and turf density, which often reflect long-term or chronic conditions affecting turf performance. Although not separately described in more detail herein, the spectrometer data can be processed similar to the water content data, or other collected data as described herein.

GPS device 154 determines GPS coordinates for each location where data is collected. The GPS coordinates are included with each data measurement that is collected so that each measurement is associated with the location where the measurement was made.

Figure 3:
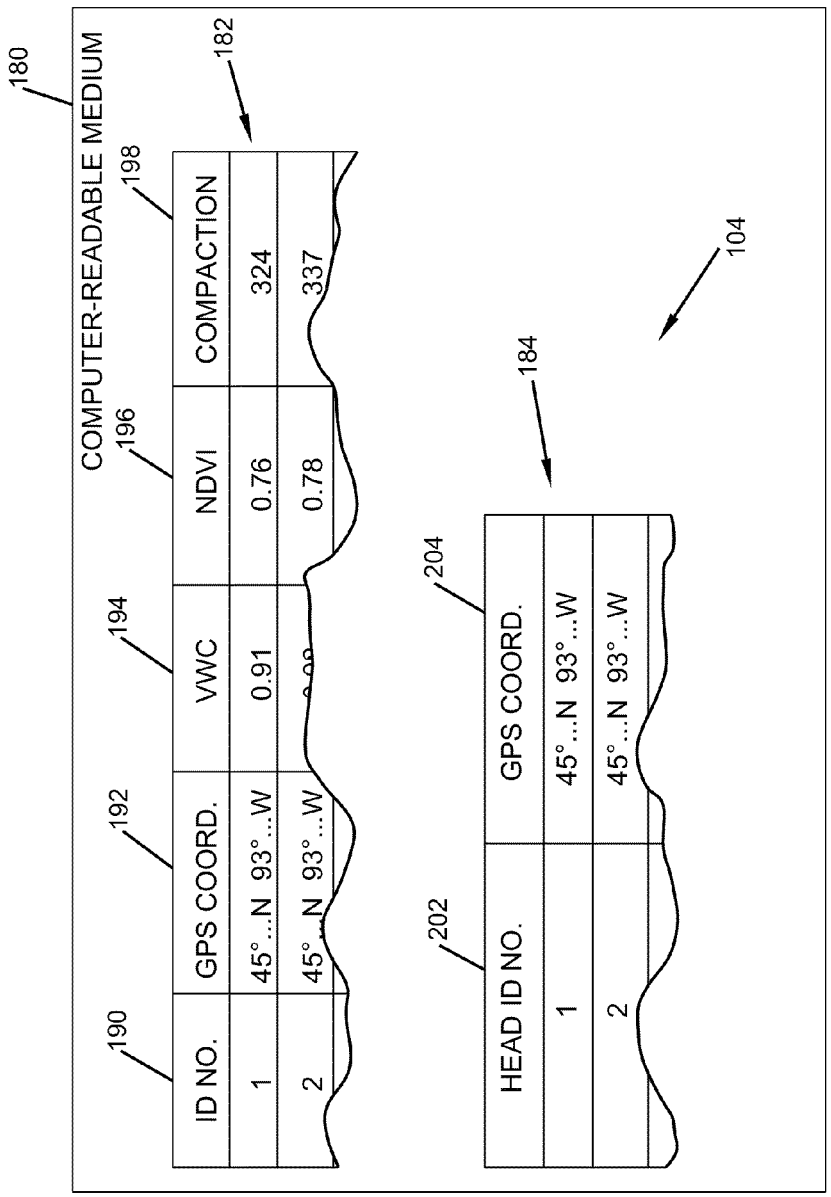
FIG. 3 is a schematic block diagram of data collected by the mobile data collection device shown in FIG. 2.

When in operation, the mobile data collection vehicle 102 is driven around the turf site 50 to collect data, such as illustrated in FIG. 3. Samples are taken periodically, such as every five to fifteen feet. The vehicle 102 can be driven back and forth across the turf site, with each pass being spaced approximately five to fifteen feet apart, to collect data across the entire turf site 50, or any desired portion of the turf site 50. In addition, the mobile data collection vehicle 102 can be driven about the turf site 50 to identify locations of sprinkler heads, which are also recorded as shown in FIG. 3. In another embodiment, the sprinkler head locations are identified by a separate device, or are provided by the turf site manager.

FIG. 3 illustrates an example of collected data 104 that is collected by the mobile data collection device 102. In this example, data 104 is stored on a computer-readable medium 180 and includes records 182 and 184.

Record 182 stores data for each sample taken at the turf site 50. In this example, data related to each sample is stored in a separate row. For example, a first sample location is assigned an ID number 190 of "1." The location data 192 (e.g., a GPS coordinate) is also stored, along with the measured values, such as: a moisture value 194 (e.g., volumetric water content percentage), a turf vigor value 196 (e.g., NDVI), and a compaction value 198 (e.g., pounds per square inch). Additional or less data can be measured as desired and stored in record 182. Additional rows are added for each sample of the turf site 50.

The location data 192 can include a latitude, longitude, and altitude. The GPS altitude data can be used to generate an elevation model. It has been found that the altitude values that are recorded by a typical GPS system are not, themselves, highly reliable. However, differences between two collected and adjacent altitude values tend to have greater reliability. Further, these values can be interpolated, such as using the Kriging technique described elsewhere herein, to define spatial relationships between the altitude difference values (in other words, to compare data points with other surrounding data points) to provide even more reliable data.

In some embodiments, site elevation data is used instead or in addition to GPS altitude data. An elevation model (whether based on site elevation data or GPS altitude data) is used to calculate slope and aspect values. In some embodiments interpolation techniques are used to compute the slope and aspect values at shorter intervals than available from the collected data, such as along a two foot by two foot grid. Some embodiments utilize a multiple linear regression that includes slope and aspect. This data can be used, for example, to isolate the water input from each sprinkler head.

In some embodiments, record 182 further includes time stamps for each sample, identifying the time at which the sample was taken. The time stamp can be in the form of month/day/year and hour:minute:second, for example. In some embodiments, time data is used in an algorithm to normalize the turf vigor values, and/or to filter out time of day effects on the NDVI values, discussed herein.

Record 184 stores data identifying the positions of each of the sprinkler heads 62 on the turf site 50. In this example, the record 180 includes a sprinkler head identification number 202, and a location (e.g., GPS coordinate) of the sprinkler head.

Once the data 104 has been collected and stored, it can be provided to the data processing lab 106 (shown in FIG. 1) where it is further evaluated.

Figure 4:
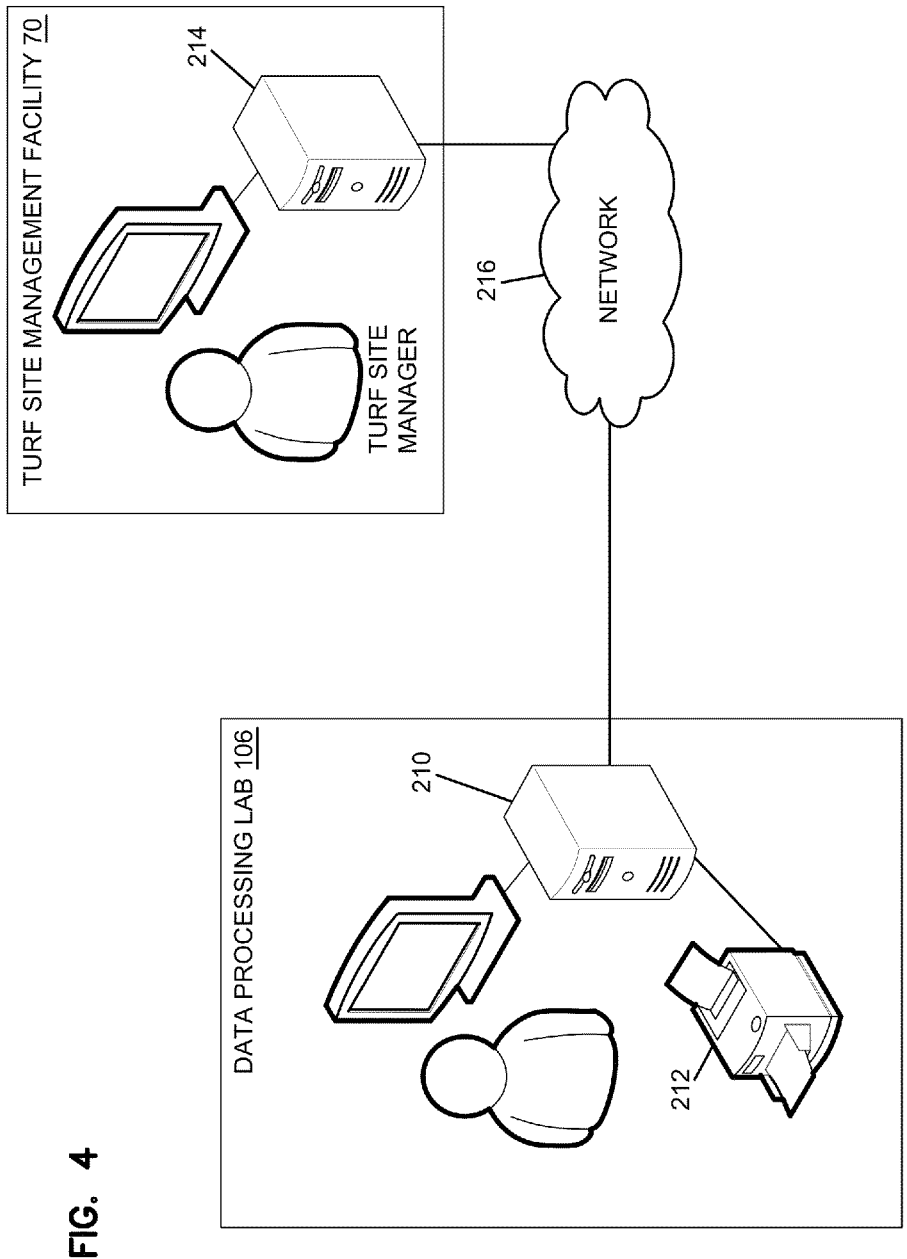
FIG. 4 is a schematic diagram of the data processing lab of the irrigation auditing system shown in FIG. 1.

FIG. 4 is a schematic diagram of the data processing lab 106 of the irrigation auditing system 100, and further illustrating communication with the turf site management facility 70. In this example, the data processing facility includes a computing device 210 and a printer 212. The turf site management facility 70 includes a computing device 214. Communication between the data processing lab 106 and the turf site management facility 70 can occur across a data communication network 216.

In one example embodiment, the data processing lab includes the computing device 210 that operates to perform one or more of the operations described herein. An example of a suitable computing device 210 is illustrated and described in more detail with reference to FIG. 5. Some embodiments include one or more computing devices, that collectively perform one or more of the operations described herein. In some embodiments a person interacts with the computing device to perform certain operations.

A printer 212 is provided in some embodiments to print a report generated by the data processing lab on paper. In other embodiments, the report is saved electronically on a computer readable storage medium with the computing device 210, and can be transferred to the turf site management facility computing device 214, such as across the data communication network 216.

Another possible embodiment utilizes a client-server architecture. In this embodiment, the data processing lab 106 includes one or more server computing devices 210. The turf site management facility 70 utilizes a client computing device 214 to interact with the server 210. For example, server 210 can be a web server, which provides data to computing device 214 in the form of web page data. The web page data is interpreted by a browser computing device 214 at turf site management facility. In this example, the turf site manager can control and/or interact with the operations that occur at data processing lab 106 by the server 210. In yet another embodiment, the computing device 214 operates a non-browser software application to interact with server 210.

In yet another embodiment, the computing device 210 is a mobile computing device, such as a smart phone, a tablet computer, a laptop computer, etc. In some embodiments, the computing device 210 is located at the turf site or the turf site management facility 70 while performing the operations of the data processing lab 106 described herein. In some embodiments, presentation of the report to the turf site manager involves showing the report to the turf site manager on the mobile computing device 210 at the turf site management facility, in which case the transfer of the report across the data communication network 216 may not be necessary. In yet another embodiment, the report is physically transferred to the turf site management facility, such as by mail or delivery, in a printed form or on a computer readable storage medium.

In yet another embodiment, data processing lab 106 utilizes cloud computing, and operations of the data processing lab 106 can be distributed across one or more computing devices.

Figure 5:
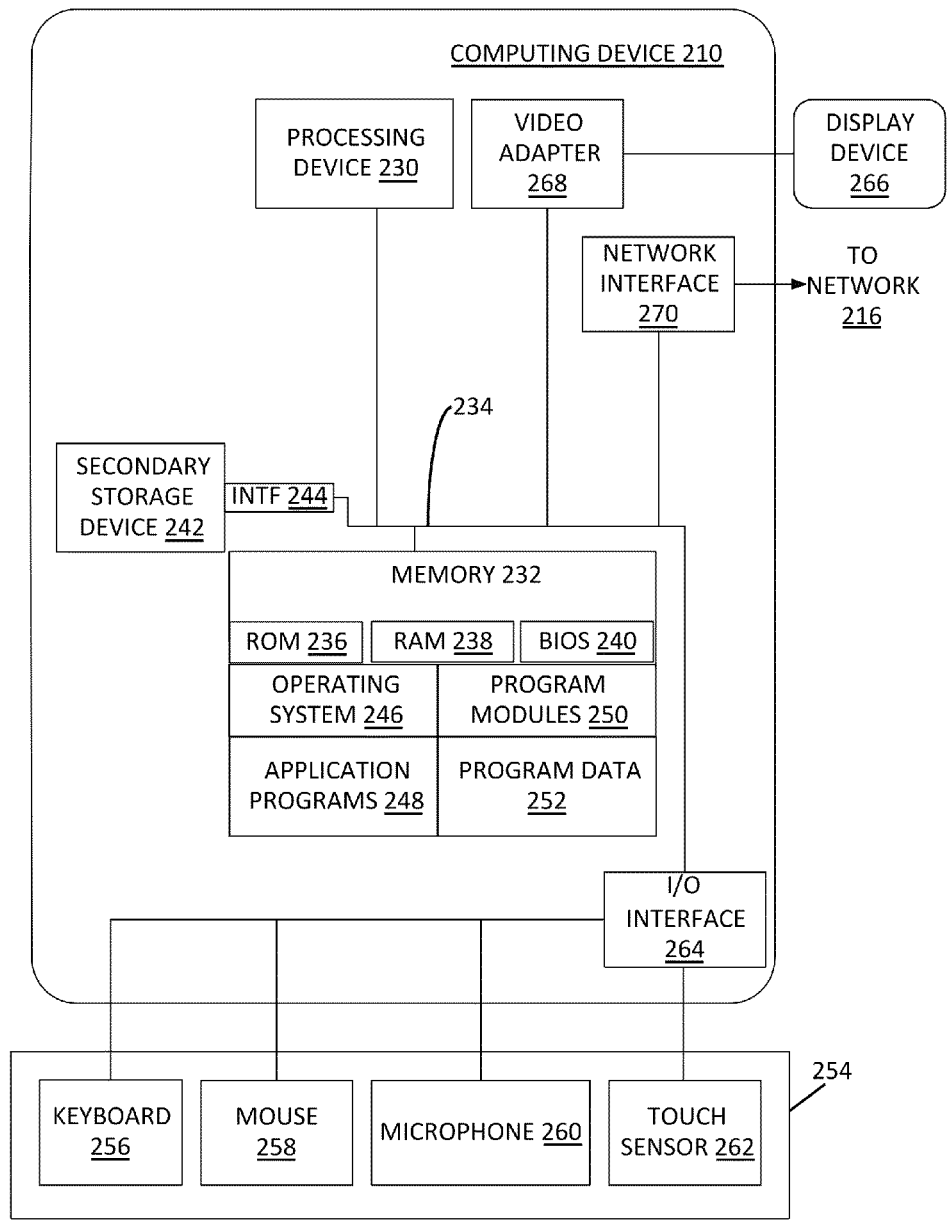
FIG. 5 illustrates an exemplary architecture of a computing device that can be used to implement aspects of the present disclosure.

FIG. 5 illustrates an exemplary architecture of a computing device that can be used to implement aspects of the present disclosure, including any of the data processing lab computing device 210 (FIG. 4), mobile data collection device computing device 138 (FIGS. 1-2), or turf site management facility computing device 214 (FIG. 4). The computing device illustrated in FIG. 5 can be used to execute the operating system, application programs, and software modules (including the software engines) described herein. By way of example, the computing device will be described below as the data processing lab 106 (FIG. 4) computing device 210. To avoid undue repetition, this description of the computing device will not be separately repeated herein for each of the other computing devices, including computing devices 138 and 214, but such devices can also be configured as illustrated and described with reference to FIG. 5.

The computing device 210 includes, in some embodiments, at least one processing device 230, such as a central processing unit (CPU). A variety of processing devices are available from a variety of manufacturers, for example, Intel or Advanced Micro Devices. In this example, the computing device 210 also includes a system memory 232, and a system bus 234 that couples various system components including the system memory 232 to the processing device 230. The system bus 234 is one of any number of types of bus structures including a memory bus, or memory controller; a peripheral bus; and a local bus using any of a variety of bus architectures.

Examples of computing devices suitable for the computing device 210 include a desktop computer, a laptop computer, a tablet computer, a mobile computing device (such as a smart phone, an iPod® or iPad® mobile digital device, or other mobile devices), or other devices configured to process digital instructions.

The system memory 232 includes read only memory 236 and random access memory 238. A basic input/output system 240 containing the basic routines that act to transfer information within computing device 210, such as during start up, is typically stored in the read only memory 236.

The computing device 210 also includes a secondary storage device 242 in some embodiments, such as a hard disk drive, for storing digital data. The secondary storage device 242 is connected to the system bus 234 by a secondary storage interface 244. The secondary storage devices 242 and their associated computer readable media provide nonvolatile storage of computer readable instructions (including application programs and program modules), data structures, and other data for the computing device 210.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in secondary storage device 242 or memory 232, including an operating system 246, one or more application programs 248, other program modules 250 (such as the software engines described herein), and program data 252. The computing device 210 can utilize any suitable operating system, such as Microsoft Windows®, Google Chrome™, Apple OS, and any other operating system suitable for a computing device. Other examples can include Microsoft, Google (e.g., the Android operating system), or Apple operating systems, or any other suitable operating system used in tablet or other mobile computing devices.

In some embodiments, a user provides inputs to the computing device 210 through one or more input devices 254. Examples of input devices 254 include a keyboard 256, mouse 258, microphone 260, and touch sensor 262 (such as a touchpad or touch sensitive display). Other embodiments include other input devices 254. The input devices are often connected to the processing device 230 through an input/output interface 264 that is coupled to the system bus 234. These input devices 254 can be connected by any number of input/output interfaces, such as a parallel port, serial port, game port, or a universal serial bus. Wireless communication between input devices and the interface 264 is possible as well, and includes infrared, BLUETOOTH® wireless technology, 802.11a/b/g/n, cellular, or other radio frequency communication systems in some possible embodiments.

In this example embodiment, a display device 266, such as a monitor, liquid crystal display device, projector, or touch sensitive display device, is also connected to the system bus 234 via an interface, such as a video adapter 268. In addition to the display device 266, the computing device 210 can include various other peripheral devices (not shown), such as speakers or a printer.

When used in a local area networking environment or a wide area networking environment (such as the Internet), the computing device 210 is typically connected to the network 216 through a network interface 270, such as an Ethernet interface. Other possible embodiments use other communication devices. For example, some embodiments of the computing device 210 include a modem for communicating across the network.

The computing device 210 typically includes at least some form of computer-readable media. Computer readable media includes any available media that can be accessed by the computing device 210. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 210.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 5 is also an example of programmable electronics, which may include one or more such computing devices, and when multiple computing devices are included, such computing devices can be coupled together with a suitable data communication network so as to collectively perform the various functions, methods, or operations disclosed herein.

Figure 6:
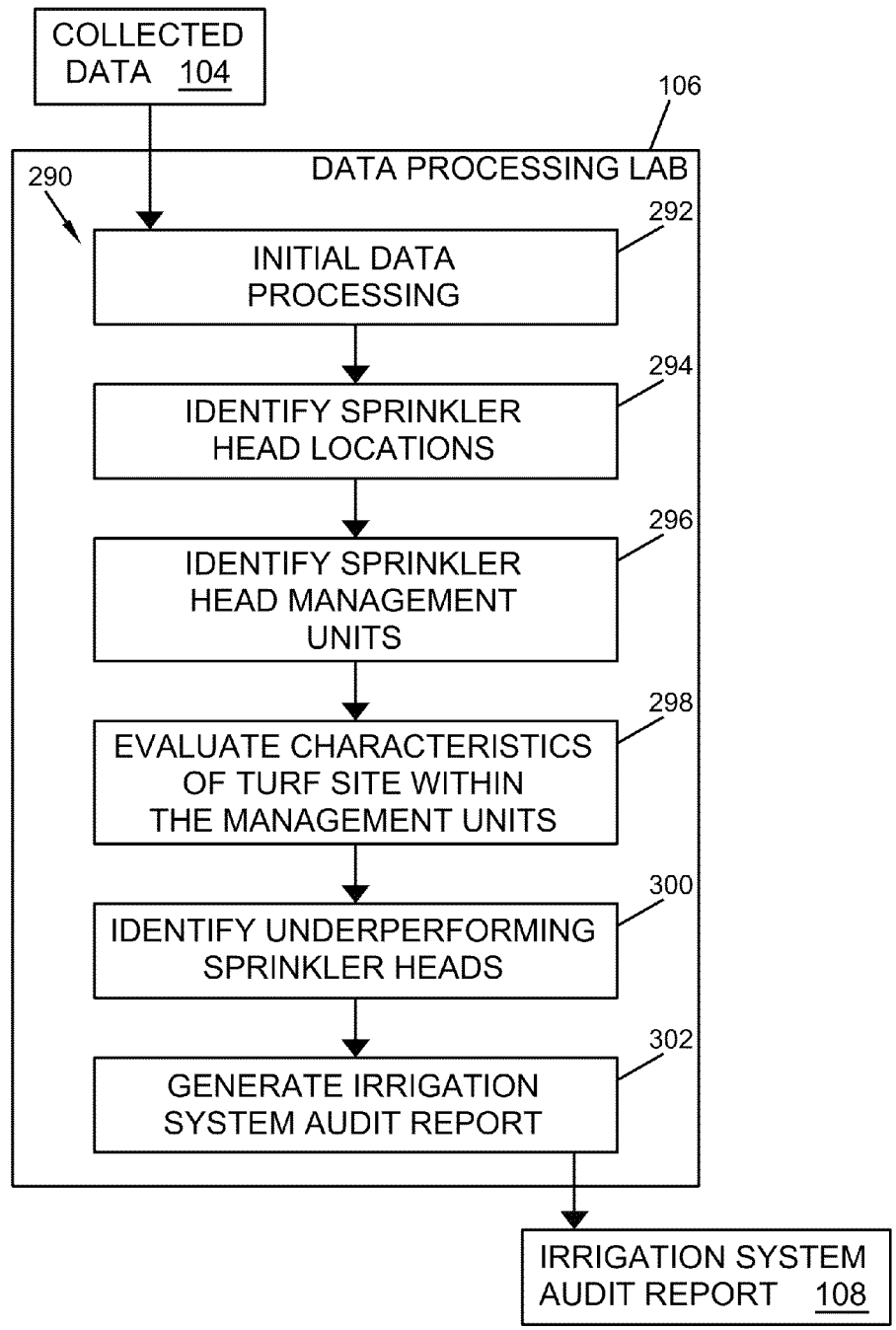
FIG. 6 is a schematic block diagram of the example data processing lab shown in FIG. 4.

FIG. 6 is a schematic block diagram of an example data processing lab 106. FIG. 6 also illustrates an exemplary method 290 of generating an irrigation system audit report. The method includes operations 292, 294, 296, 298, 300, and 302. In some embodiments, the data processing lab receives collected data 104, such as collected by the mobile data collection device 102.

In some embodiments, after the collected data 104 is received at the data processing lab 106, one or more initial processing operations 292 are performed on the data. Some embodiments do not perform initial processing operations 292.

In one example embodiment, the data processing lab 106 includes an interpolation engine that performs some or all of the initial processing operations 292. The interpolation engine operates to improve the resolution of data points, such as to convert the collected data 104 points, shown in FIG. 3, to fine data points. For example, if data points stored in collected data 104 were collected at intervals of approximately eight to ten feet from each other, the interpolation engine processes the data to generate fine data points. The fine data points are estimated values at shorter intervals between the collected data points, such as approximately two foot intervals. Larger or smaller intervals are used in other embodiments, one foot intervals or three foot intervals.

A variety of interpolation techniques can be used in various embodiments, such as linear interpolation, polynomial interpolation, spline interpolation, etc. Some embodiments utilize geostatistical interpolation techniques, such as kriging. Kriging assumes a spatial relationship between the data, and therefore compares data points with adjacent data points when computing fine data points.

Operation 294 identifies the sprinkler head locations at the turf site. In some embodiments, operation 294 involves accessing record 184 (shown in FIG. 3) in which the locations of each sprinkler head are stored. In other embodiments, sprinkler head locations are read from another file, such as a spreadsheet or database.

Once the locations of sprinkler heads are known, additional processing can be performed, such as to compute average distances between sprinkler heads on the turf site, or a subset of the turf site (e.g., a single fairway).

Sprinkler head spacing patterns can also be evaluated, such as to identify whether the sprinkler heads are arranged in rectangular or triangular spacing patterns, and whether there are sprinkler heads that deviate from the pattern(s). Rectangular spacing arranges the sprinkler heads in a grid-pattern having a lateral spacing and a line spacing, where the lateral spacing and the line spacing can be the same (e.g., square), or different (e.g., rectangular). With triangular spacing, the distance between sprinkler heads is the same distance as between all nearest sprinkler heads (e.g., equilateral triangles).

Operation 296 identifies boundaries of sprinkler head management units. In some embodiments, the sprinkler head management unit for a sprinkler head is a segment of the turf site in which all points within the segment are closer to the sprinkler head than any adjacent sprinkler heads. For example, the sprinkler head management unit may be the portion of the turf site that is most influenced by that sprinkler head.

One method of identifying boundaries of the sprinkler head management units, involves identifying midpoints of lines extending between adjacent sprinkler heads. A perpendicular bisector arranged at the midpoint forms one boundary of the sprinkler head management unit. The bisector extends until it intersects with another bisector, forming the end of that line of the boundary. In this way, the boundaries of the sprinkler head management units are defined by polygons, where each point within the polygon is closest to the respective sprinkler head than any other sprinkler head. In this example, none of the sprinkler head management units overlap.

In other possible embodiments, the sprinkler head management units are defined by a spray distance of the sprinkler head, or an approximation of the spray distance. For example, sprinkler head management units can be defined as an estimated segment of the turf site which receives water from the respective sprinkler Often sprinkler heads are spaced apart at approximately the spray distance of the sprinklers. So, a sprinkler head that sprays 80 feet, will often be spaced about 80 feet away from adjacent sprinkler heads. Accordingly, the spacing of the sprinkler heads can be automatically computed by the data processing lab 106 based on the sprinkler head locations, and subsequently used as an estimate of the sprinkler head spray distance. Sprinkler head management units can therefore be defined as the segment of the turf site within the sprinkler head spray distance (e.g., 80 feet) of the respective sprinkler head, in which case the sprinkler head management units will typically overlap with adjacent units. In another possible embodiment, the sprinkler head management unit is defined as the segment of the turf site within a fraction of the spray distance of a sprinkler head, such as within one half of the spray distance. Other embodiments use other fractions, such as 40%, 50%, 60%, 70%, 75%, 80%, 90%, or 95%.

In some embodiments, different sprinkler head management units can be defined and used for evaluating different characteristics of the turf site associated with a single sprinkler head. For example, a sprinkler head management unit can be defined by polygons for evaluating soil moisture variability, while a sprinkler head management unit can be defined by one-half of the average sprinkler head spacing for evaluating soil moisture distribution, etc.

Operation 298 evaluates one or more characteristics of the turf site within the sprinkler head management units. An example of operation 298 is illustrated and described in more detail with reference to FIGS. 7-17.

Operation 300 utilizes the results of operation 298 and identifies underperforming sprinkler heads. An example of operation 300 is illustrated and described in more detail with reference to FIG. 18.

An irrigation system audit report 108 is generated by operation 302. An example of an irrigation system audit report 108 is illustrated and described in more detail with reference to FIGS. 19-21.

Each of the operations depicted in FIG. 6 can be performed by a corresponding engine of the data processing lab. For example, in some embodiments operation 292 is performed by an initial data processing engine, operation 294 is performed by a head locating engine, operation 296 is performed by a management unit identification engine, operation 298 is performed by a head identification engine, and operation 300 is performed by an audit report generation engine.

Any one or more of the operations and engines depicted in FIG. 6 can alternatively be a stand-alone operation or engine, or can be combined to form another operation or engine. None of the operations or engines depicted in FIG. 6 are required in all embodiments.

Figure 7:
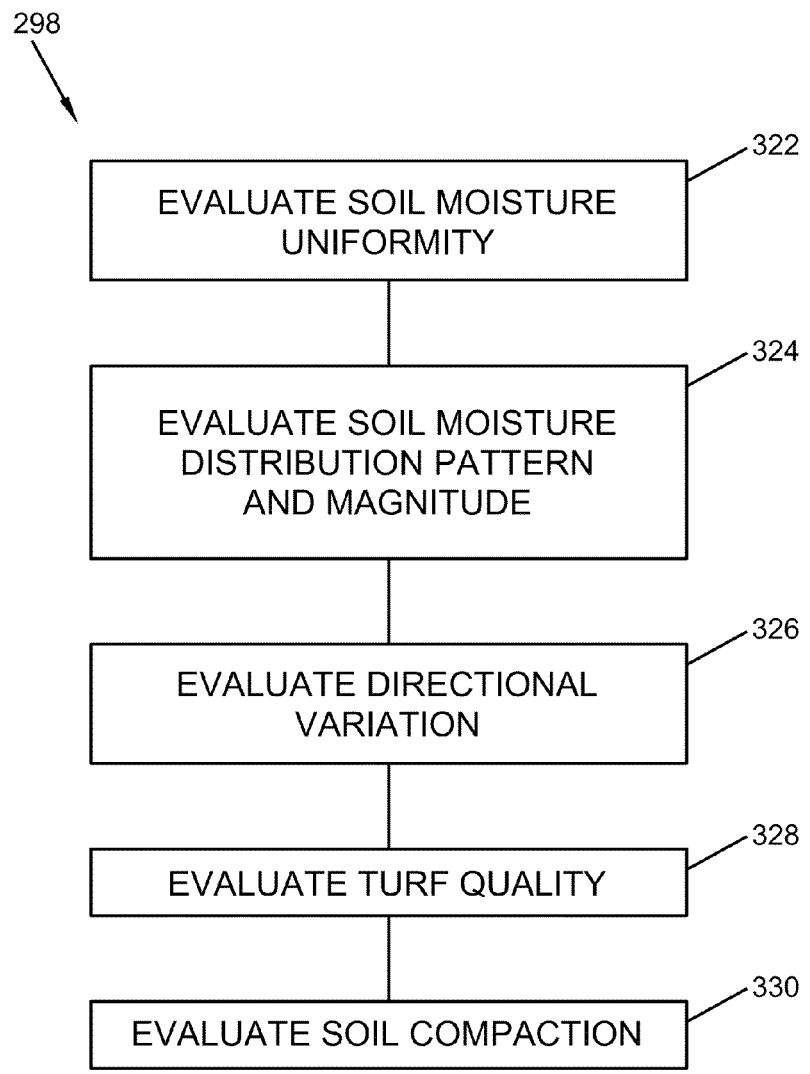
FIG. 7 is a flow chart illustrating an exemplary method of evaluating sprinkler head performance.

FIG. 7 is a flow chart illustrating an example of operation 298, which includes a method of evaluating one or more characteristics of a turf site by sprinkler head management unit, and a method of evaluating sprinkler head performance. In this example, operation 298 includes operations 322, 324, 326, 328, and 330. Operation 298 can include any one or more of the operations shown, and can also include additional operations in other embodiments.

In some embodiments, operation 298 is performed to evaluate characteristics of a single sprinkler head management unit, as an indicator of sprinkler head performance. The operation 298 can be repeated for each sprinkler head of an irrigation system, in order to evaluate all or a subset of the sprinkler heads of an irrigation system.

Operation 322 is performed to evaluate soil moisture uniformity within a sprinkler head management unit. Moisture uniformity is the variation in soil moisture (e.g., volumetric water content) within the sprinkler head management unit associated with a sprinkler head.

In some embodiments, moisture uniformity is calculated using a lowest quartile formula. An example of the lowest quartile formula computes the mean of the lowest quarter of soil moisture values within the sprinkler head management unit, and is divided by the mean of all of the soil moisture values within the sprinkler head management unit.

In some embodiments, the soil moisture uniformity value is then compared to a threshold value. An example of a threshold value is 85%. Other embodiments utilize other threshold values. For example, a threshold value of 80% could alternatively be used, or a variety of other values.

A moisture uniformity value below the threshold indicates a low moisture uniformity, which can be used by the data processing lab 106 as an indication that the sprinkler head associated with the sprinkler head management unit may be underperforming.

Moisture uniformity is not the same as distribution uniformity. Distribution uniformity is a measurement of the amount of water from a sprinkler head that strikes a given portion of the turf site. Distribution uniformity is not equal to moisture uniformity, because distribution uniformity does not consider what happens to the water after it strikes the surface, which may include significant runoff, for example. Moisture uniformity tends to be somewhat higher than distribution uniformity because of the buffering capacity of the site conditions once irrigation water strikes the surface.

Operation 324 is performed to evaluate a soil moisture distribution pattern and an associated magnitude of that pattern within the sprinkler head management unit. This operation evaluates the soil moisture distribution to determine whether certain common patterns may exist. For example, some sprinkler heads will not spray as much water (per unit area) near the sprinkler head as is sprayed a greater distance from the sprinkler head. This can create a ring shaped moisture distribution pattern, in which the center is dry and the outer portion is wet.

Figure 8:
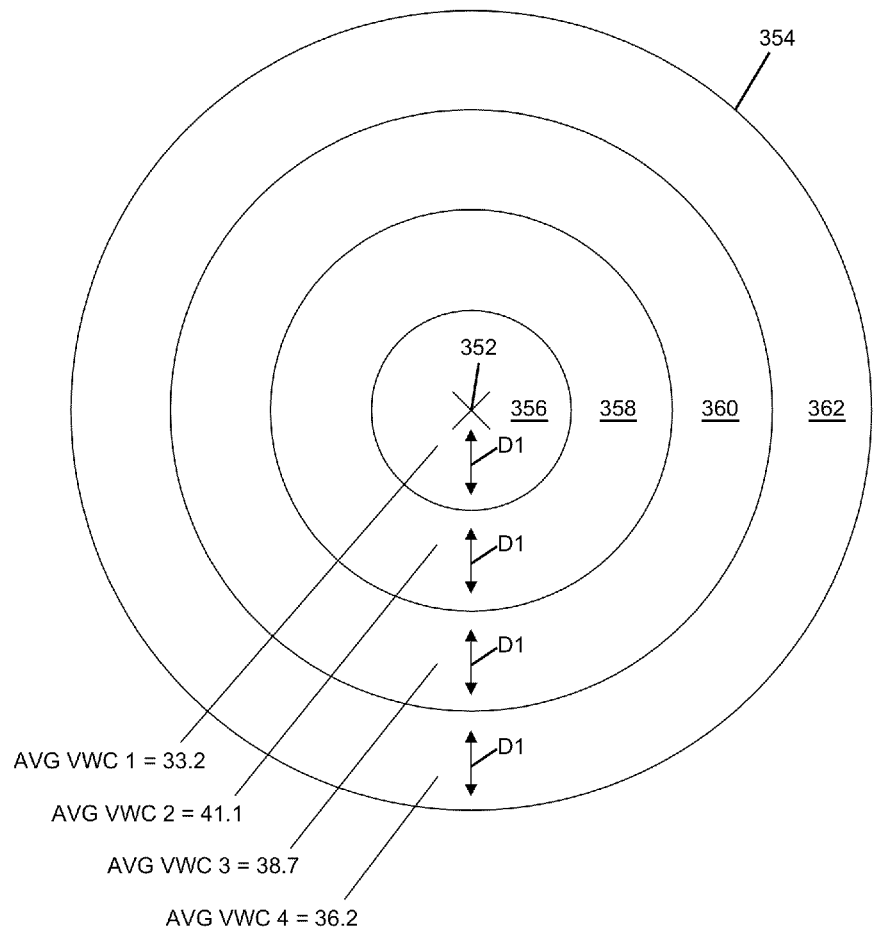
FIG. 8 is a graph depicting an exemplary concentric band analysis of the method shown in FIG. 7.
Figure 9:
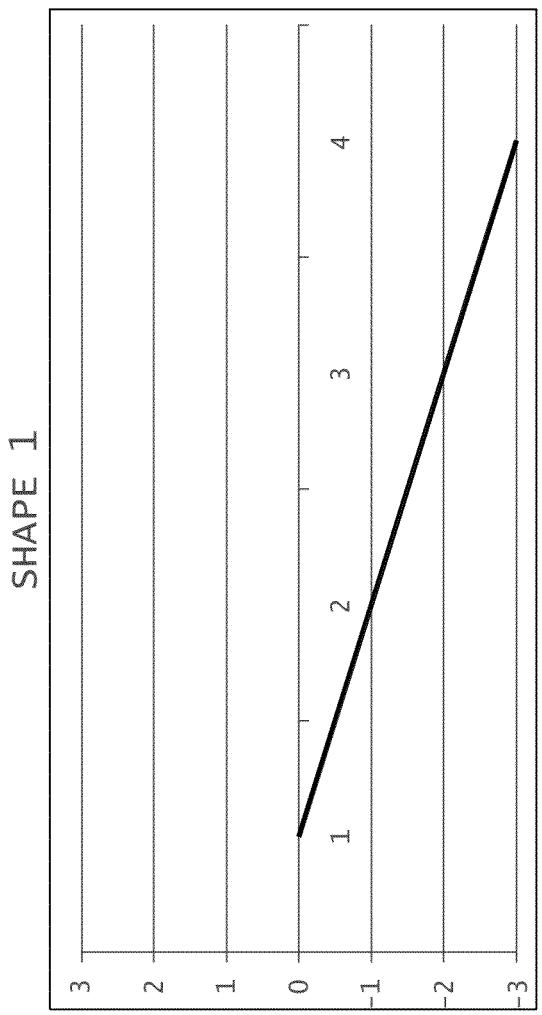
FIG. 9 is a graph illustrating an exemplary sprinkler head pattern shape as generated by the method shown in FIG. 7.
Figure 10:
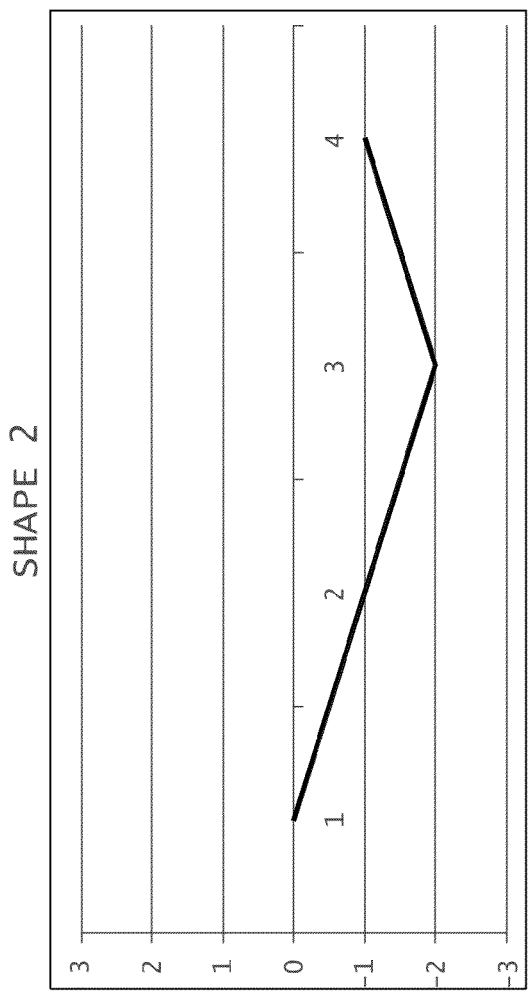
FIG. 10 is a graph illustrating another exemplary sprinkler head pattern shape.
Figure 11:
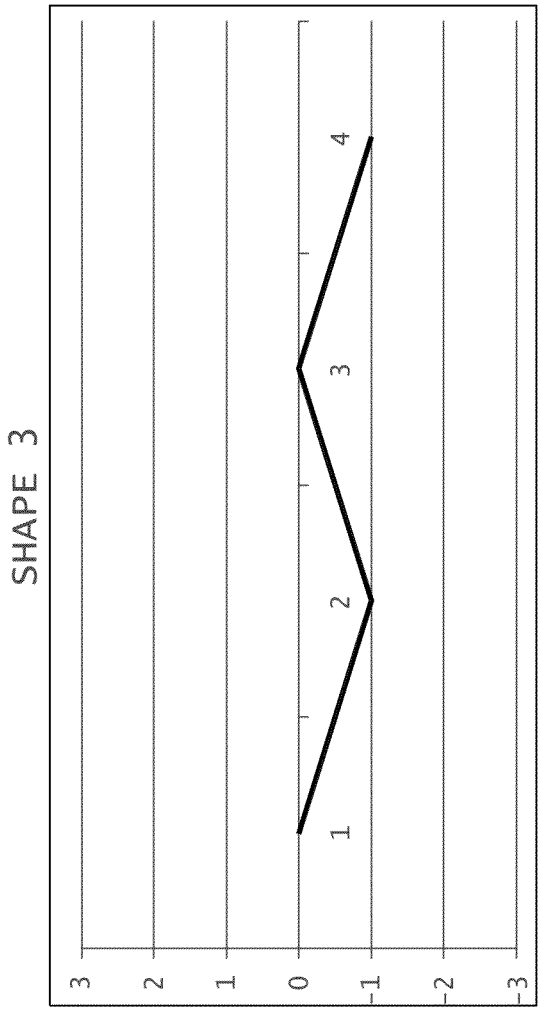
FIG. 11 is a graph illustrating another exemplary sprinkler head pattern shape.
Figure 12:
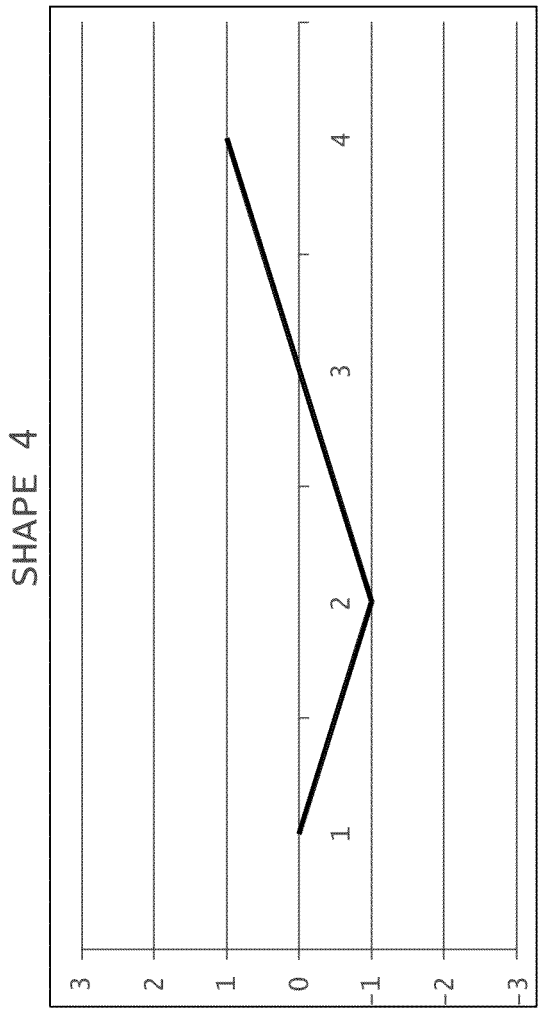
FIG. 12 is a graph illustrating another exemplary sprinkler head pattern shape.
Figure 13:
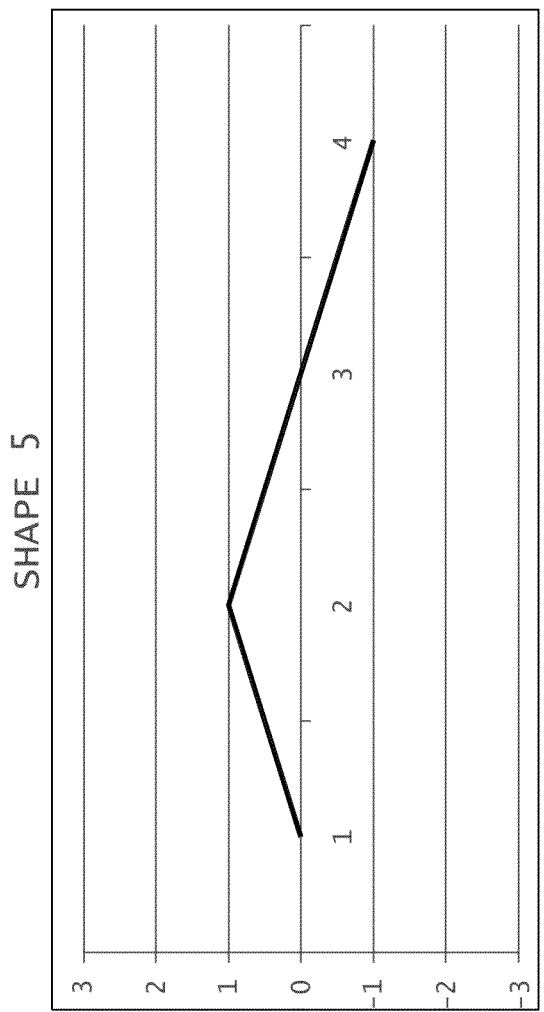
FIG. 13 is a graph illustrating another exemplary sprinkler head pattern shape.
Figure 14:
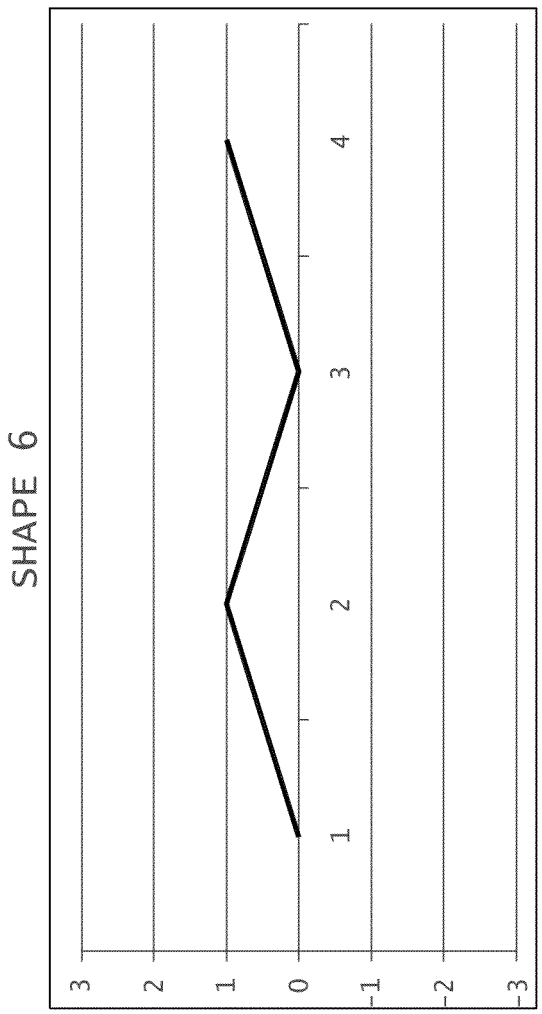
FIG. 14 is a graph illustrating another exemplary sprinkler head pattern shape.
Figure 15:
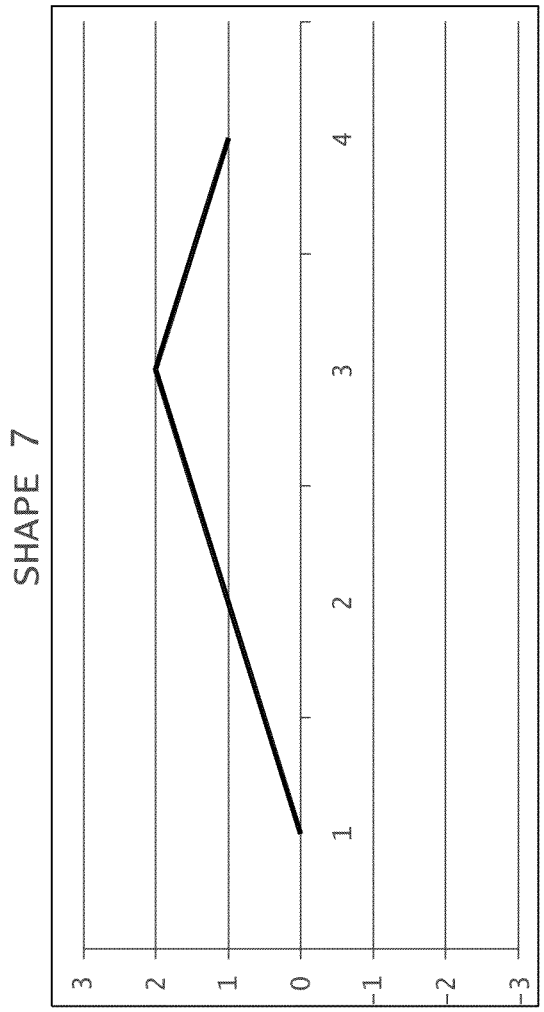
FIG. 15 is a graph illustrating another exemplary sprinkler head pattern shape.
Figure 16:
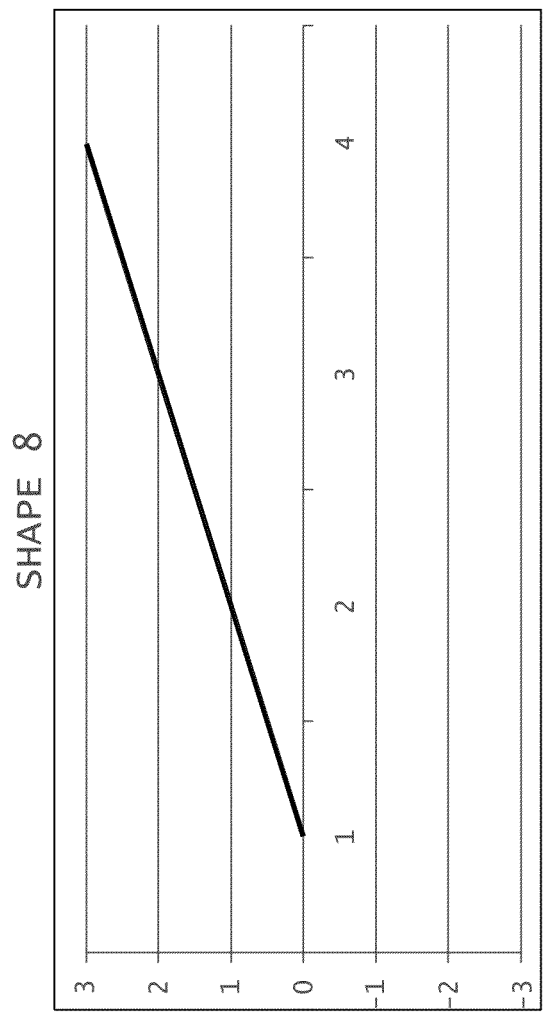
FIG. 16 is a graph illustrating another exemplary sprinkler head pattern shape.

In some embodiments, operation 324 involves the computation of the average volumetric water content within concentric bands outward from each sprinkler head. In some embodiments the quantity of concentric bands varies from about 3 to about 6, although more or fewer bands could also be used. As one example, four bands can be used. The concentric bands can extend outward to the edges of the sprinkler head management unit. For example, if the average sprinkler head spacing is 80 feet, concentric bands can be defined from the sprinkler head to one-half of the sprinkler head spacing (e.g., 40 feet). In this example, each concentric band would then be defined in 10 foot increments around the sprinkler head. An example is shown in FIG. 8.

In some embodiments, once the average volumetric water content values are known for each band, the results are used to categorize the sprinkler heads as having one of a plurality of pattern shapes. In an example embodiment, the pattern is categorized into one of eight possible pattern shapes. A first set (e.g., four) of the pattern shapes describe variations on a basic pattern that is drier near the sprinkler head and wetter with distance outward. The other set (e.g., four) of the pattern shapes describe variations on a basic pattern that is wetter near the sprinkler head and drier with distance outward. Examples are illustrated in FIGS. 9-16.

The pattern shape categories can be useful in describing and generalizing a sprinkler head spray pattern, and the associated soil moisture pattern.

A magnitude of the soil moisture distribution pattern is computed in some embodiments. The magnitude represents the amount of change in soil moisture between the concentric bands.

In an example embodiment, the magnitude of the soil moisture distribution pattern is computed by subtracting the minimum soil moisture value within the sprinkler head management unit from the maximum soil moisture value within the sprinkler head management unit, and dividing by the average soil moisture value within the management unit.

In some embodiments, the magnitude is compared to a magnitude threshold. An example of a magnitude threshold is 20%, but other embodiments utilize other values. For example, a magnitude greater than the magnitude threshold can be considered an indication that the associated sprinkler head may be underperforming, due to a large difference in soil moisture distribution.

Operation 326 is performed to evaluate directional variation within the sprinkler head management unit. In some embodiments, directional variation involves evaluating soil moisture content in various directions from the sprinkler head. For example, the sprinkler head management unit can be divided into multiple segments, such as four quadrants. Within each quadrant, soil moisture values can be evaluated. An example is illustrated and described in more detail with reference to FIG. 17.

In some embodiments, the evaluation of soil moisture values involves evaluating the soil moisture distribution pattern within the segment, assigning a pattern shape to the distribution pattern within the segment, and evaluating a magnitude of the soil moisture distribution within the segment (as discussed in more detail with reference to operation 324 and FIGS. 8-16).

Then, the magnitude of variation between the segments is then computed for each concentric band, using the average soil moisture values for each concentric band within each quadrant. For example, the minimum value is subtracted from the maximum value, which is then divided by the average of the values.

If the variation between segments for any concentric band is greater than a threshold, the sprinkler head is determined to exhibit high directional variability. An example of the threshold is 15%, but other embodiments utilize other threshold values. A determination that the sprinkler head exhibits high directional variability can be used as an indication that the sprinkler head is underperforming. More specifically, the high directional variability may indicate a stuck/non-rotating head, an obstruction to part of the spray pattern, a tilted head, or other potential problems with the sprinkler head.

High directional variability may indicate a problem with an adjacent sprinkler head. For example, if a northeast quadrant of a sprinkler head management unit has significantly lower soil moisture than other quadrants, the high directional variability may indicate that the sprinkler head that is located northeast of the sprinkler head management unit is underperforming.

Operation 328 is performed to evaluate turf quality within the sprinkler head management unit. In some embodiments, turf vigor data is compared with soil moisture data to determine how strongly correlated the turf quality is to the soil moisture.

In an example embodiment, a turf quality correlation value is computed in the same way as the soil moisture distribution of operation 324, by dividing the sprinkler head management unit into concentric bands and utilizing the turf vigor data. The correlation coefficient is then calculated between the change in turf vigor and soil moisture. A high positive correlation indicates that the variability in soil moisture is severe enough to cause a parallel change in turf vigor. A high correlation indicates the potential of a more serious issue with the sprinkler head (severe enough to cause a decline in turf quality).

In some embodiments, the absolute value of the turf quality correlation value is compared with a threshold value. An example of a threshold value is 0.65 (out of 1) but other embodiments utilize other threshold values. A value above the threshold can be an indication that the associated sprinkler head is underperforming.

Operation 330 is performed to evaluate soil compaction within the sprinkler head management unit. In some embodiments, soil compaction is compared with soil moisture data to determine how strongly correlated the soil compaction is to the soil moisture.

In an example embodiment, a soil compaction value is computed in the same way as the soil moisture distribution of operation 324, by dividing the sprinkler head management unit into concentric bands and utilizing the compaction data. The compaction coefficient is then calculated between the change in soil compaction and soil moisture. A high negative correlation indicates that the variability in soil moisture is severe enough to cause an inverse parallel change in soil compaction. A high inverse correlation indicates the potential of a more severe issue with the sprinkler head.

In some embodiments, the absolute value of the compaction correlation value is compared with a threshold value. An example of a threshold value is 0.65 (out of 1) but other embodiments utilize other threshold values. An absolute value of the compaction correlation value that is above the threshold can be an indication that the associated sprinkler head is underperforming.

Operation 298 can include more or fewer evaluation operations than shown in FIG. 7, and such operations can be performed in any desired order. Another example of a possible operation is an operation to evaluate soil salinity. Such salinity evaluation can be performed in the same manner as the moisture data discussed above, but utilizing the soil salinity data.

FIGS. 8-17 illustrate additional exemplary details of the evaluation shown in FIG. 7.

FIG. 8 is a graph depicting an exemplary concentric band analysis utilized to evaluate a moisture distribution pattern, such as used in operation 324, shown in FIG. 7.

In this example, a sprinkler head has a location 352. A sprinkler head management unit 354 is defined, such as being one-half of the average sprinkler head spacing distance.

In this example, the sprinkler head management unit 354 is segmented into four concentric bands having equal widths (distance D1). The average volumetric water content of each band is then computed. As one example, the bands 356, 358, 360, and 362 are computed to have average volumetric water contents of 33.2%, 41.1%, 38.7%, and 36.2%, respectively.

FIGS. 9-16 illustrate an exemplary set of sprinkler head pattern shapes. FIGS. 9-12 illustrate a first set of the pattern shapes in which the soil moisture is drier near the sprinkler head and wetter with distance outward. FIGS. 13-16 illustrate a second set of the pattern shapes in which the soil moisture is wetter near the sprinkler head and drier with distance outward.

In some embodiments, shapes are assigned as follows. First, the value of the inner concentric ring is identified as a starting value. Referring to the example shown in FIG. 8, the average volumetric water content (1) of concentric band 356 is 33.2. The inner band 356 is given a shape value of 0.

The starting value is then compared with the average volumetric water content (2) of the next concentric band, such as band 358. In the example, the value is 41.1, which is greater than the starting value. Since the value is greater, the band 358 is assigned a shape value of +1.

The value of band 358 (41.1) is then compared with the average volumetric water content (3) of the next concentric band 360 of 38.7. Since the value is less, the band 358 is assigned a shape value of −1.

The process continues until all of the concentric bands have been assigned a shape value. For example, concentric band 362 is assigned a shape value of −1.

Once the shape values have been identified, the shape values can then be plotted as shown in FIG. 9-16. For the example shown in FIG. 8, the resulting pattern shape is shape 5, shown in FIG. 13.

The pattern shapes can be useful in visualizing and categorizing sprinkler head performance, and in describing potential problems with sprinkler heads.

Figure 17:
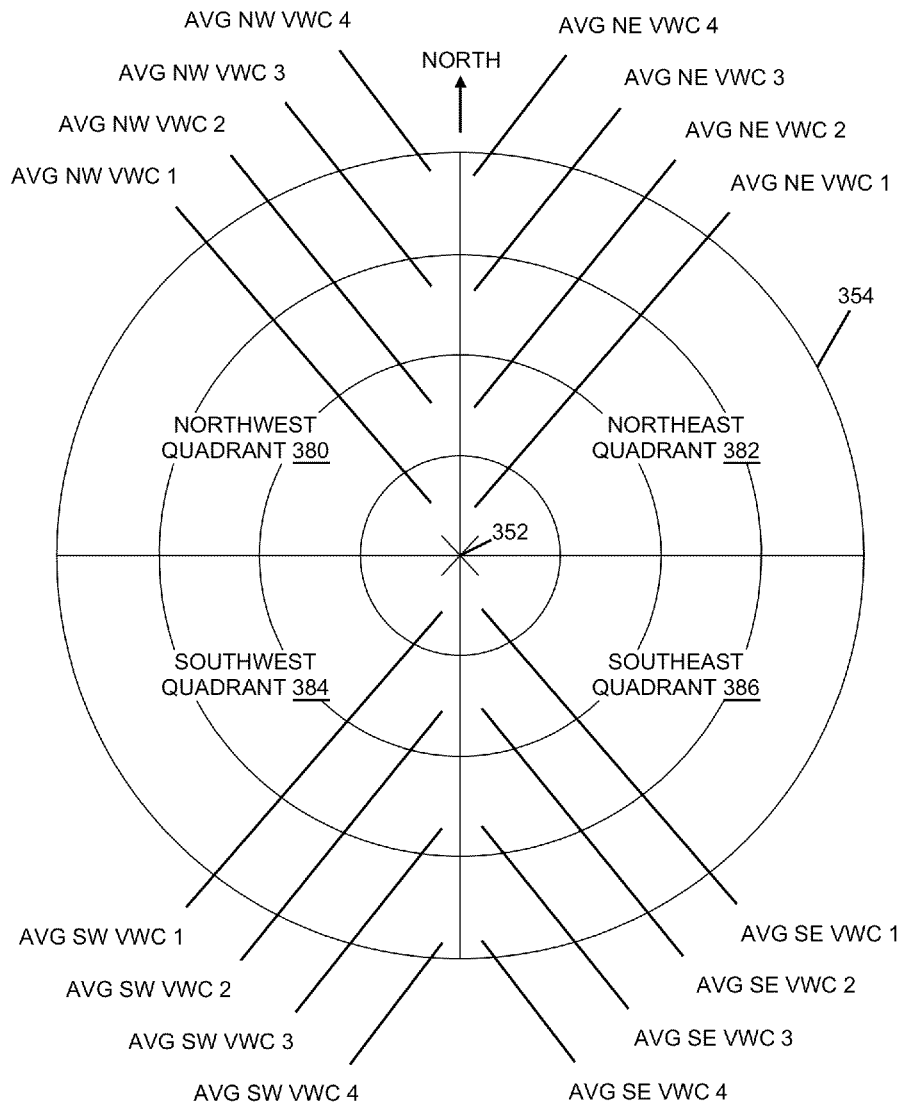
FIG. 17 is a graph depicting an exemplary directional variation analysis of the method shown in FIG. 7.

FIG. 17 is a graph depicting an exemplary directional variation analysis. In this example, a sprinkler head (at location 352) is associated with a sprinkler head management unit 354. The sprinkler head management unit is divided into a quantity of segments, such as into four quadrants. Any segments can be used. In this example, the segment boundaries are aligned with north, south, west and east compass directions, resulting in a northwest quadrant 380, northeast quadrant 382, southwest quadrant 384, and southeast quadrant 386.

Within each segment, a concentric band analysis is performed to compute the average volumetric water contents. For example, average volumetric water contents are computed for each band of the northwest quadrant, as illustrated. After the values are computed for each band of each quadrant, the variation between different quadrants can be evaluated for each band. For example, AVG NW VWC 1, AVG NE VWC 1, AVG SW VWC 1, and AVG SE VWC 1 are evaluated to compute the magnitude of variation between the quadrants.

In addition, shape patterns are assigned for each quadrant, and pattern magnitudes are also computed for each quadrant, in some embodiments.

Figure 18:
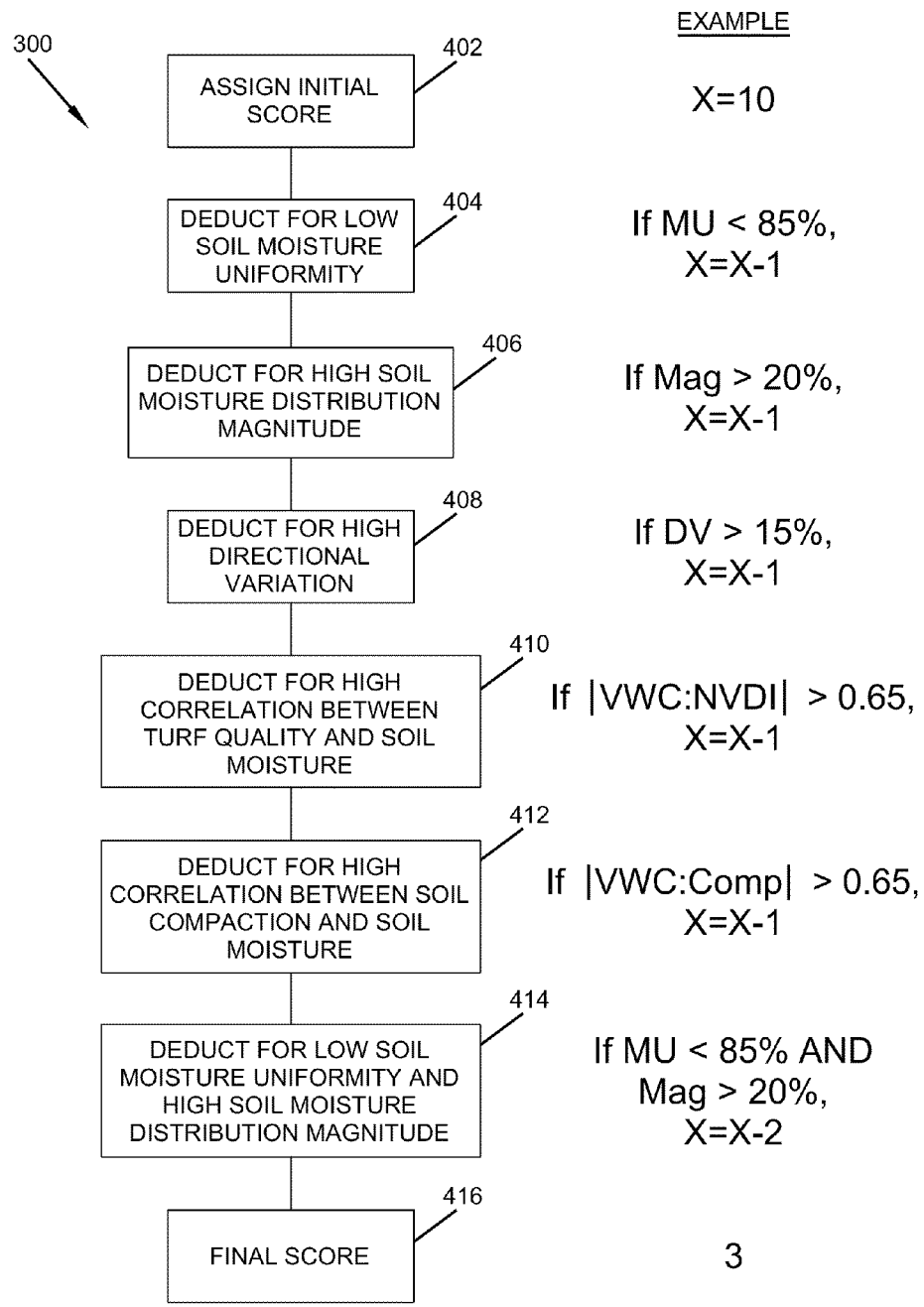
FIG. 18 is a flow chart illustrating an example method of identifying underperforming sprinkler heads.

FIG. 18 is a flow chart illustrating an example of operation 300, shown in FIG. 6, and a method of identifying underperforming sprinkler heads. FIG. 18 is also an example of a method of scoring the performance of a sprinkler head. The method includes operations 402, 404, 406, 408, 410, 412, 414, and 416.

In this example, a scoring algorithm is used to identify potentially underperforming sprinkler heads.

An initial score is assigned to the sprinkler head in operation 402, which is the highest score that can be assigned to a sprinkler head. In one example, the initial score is 10, but other initial scores can be used, such as seven or eight. Then, any one or more of the following deductions can be made in various embodiments. Some embodiments include more or fewer operations than those illustrated in FIG. 18.

Operation 404 deducts from the initial score if the soil moisture uniformity for the sprinkler head has been determined to be low. In some embodiments, the result of operation 322 (FIG. 7) is used, in which the soil moisture uniformity was computed. For example, if the computed soil moisture uniformity is below a threshold (e.g., 85%), a deduction is made. An example of the deduction is a one point deduction.

Operation 406 deducts from the initial score if the soil moisture distribution magnitude has been determined to be high. In some embodiments, the result of operation 324 (FIG. 7) is used, in which the soil moisture distribution magnitude was computed. For example, if the computed soil moisture distribution magnitude is above a threshold (e.g., 20%), a deduction is made. An example of the deduction is a one point deduction.

Operation 408 deducts from the initial score if the directional variation has been determined to be high. In some embodiments, the result of operation 326 (FIG. 7) is used, in which the directional variation was computed. For example, if the computed directional variation is above a threshold (e.g., 15%), a deduction is made. An example of the deduction is a one point deduction.

Operation 410 deducts from the initial score if the correlation between turf quality and soil moisture is high. In some embodiments, the result of operation 328 (FIG. 7) is used, in which the turf quality correlation coefficient was computed. For example, if the (absolute value of the) turf quality correlation coefficient is above a threshold (e.g., 0.65), a deduction is made. An example of the deduction is a one point deduction.

Operation 412 deducts from the initial score if the correlation between soil compaction and soil moisture is high. In some embodiments, the result of operation 330 (FIG. 7) is used, in which the compaction correlation coefficient was computed. For example, if the (absolute value of the) compaction correlation coefficient is greater than a threshold (e.g., 0.65), a deduction is made. An example of the deduction is a one point deduction.

Operation 414 deducts from the initial score (in addition to the deductions of operations 404 and 406) if the soil moisture uniformity is low and the soil moisture distribution magnitude is also low. An example of the deduction is a two point deduction.

A final score is obtained in operation 416 for the sprinkler head. In the example shown in FIG. 18, a final score between 3 and 10 is possible.

Operation 300 can be repeated for each sprinkler head, until all sprinkler heads have been evaluated and scored.

Potentially underperforming sprinkler heads can then be identified. The worst performers will be assigned a low score (e.g., 3), while the sprinkler heads that are performing well will be assigned a high score (e.g., 10).

In some embodiments, any sprinkler head having a score below a threshold (e.g., 4, 5, 6, 7, 8, 9, or 10) is identified as a potentially underperforming sprinkler head. In another possible embodiment, a set of the sprinkler heads having the lowest score are identified. For example, the lowest scoring 10% (or another percentage, such as 25%) of the sprinkler heads are identified.

The scoring algorithm can include an evaluation of more or fewer characteristics of the turf, and can include different weightings of the deductions (i.e., the deduction may be greater for a larger magnitude variation and smaller for a lesser magnitude variation). An example of another possible characteristic that can be used in the scoring algorithm is an evaluation of soil salinity, as discussed herein with reference to FIG. 7. A deduction can be made for high soil salinity, or high soil salinity variability, or for a high correlation between soil salinity and water content, as discussed herein for other collected data.

Figure 19:
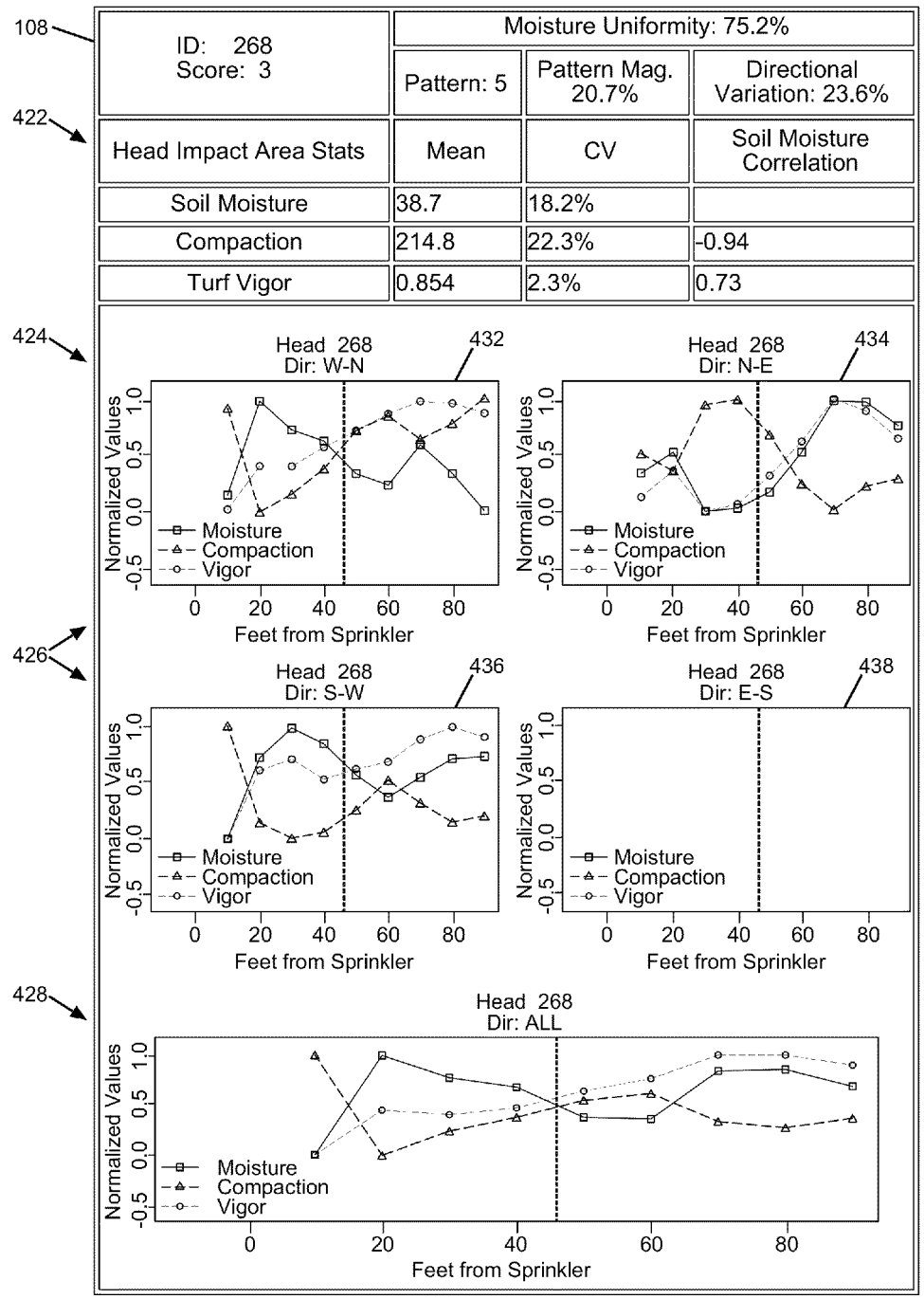
FIG. 19 is a first portion of an example audit report generated by the irrigation auditing system shown in FIG. 1.
Figure 20:
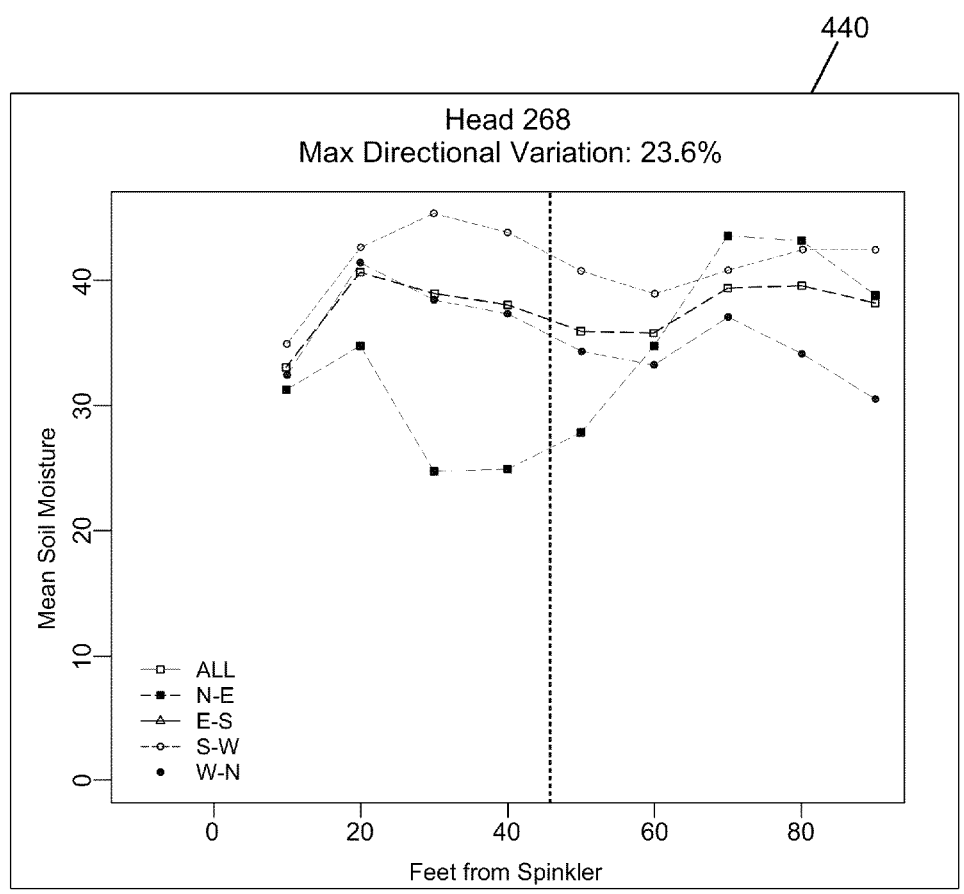
FIG. 20 is a second portion of the example audit report shown in FIG. 19.

FIGS. 19-20 illustrate an example audit report 108 (shown in FIG. 1).

FIG. 19 is a first portion of the example audit report 108. In this example, the audit report 108 provides information associated with a single sprinkler head, and the sprinkler head management unit.

The report includes a numerical section 422 and a graphical section 424.

The numerical section 422 includes numerical reports relating to the sprinkler head. The numerical section includes an identification number for the sprinkler head, and the final performance score that was computed for the sprinkler head. In this example, sprinkler head "268" has been assigned a low score of 3, indicating that the sprinkler head is likely underperforming.

The numerical section 422 also identifies the moisture uniformity (75.2%), pattern shape (shape 5), pattern magnitude (20.7%), and directional variation (23.6%).

The numerical section 422 further provides information about soil moisture, compaction, and turf vigor within the sprinkler head management unit, such as the mean value, coefficient of variation (CV), and soil moisture correlations. For example, the soil moisture has a mean of 38.7 and a coefficient of variation of 18.2%. The compaction has a mean of 214.8, a coefficient of variation of 22.3%, and a soil moisture correlation of −0.945. The turf vigor has a mean of 0.854, a coefficient of variation of 2.3%, and a soil moisture correlation of 0.73.

The graphical section 424 provides additional information in the form of various graphical plots of the data. In this example, the graphical section 424 includes segmented data plots 426 and combined data plot 428.

The segmented data plots 426 provide information about each segment of the sprinkler head management unit. In this example, the management unit has been divided into four quadrants, and a graph is provided for each quadrant including graphs 432, 434, 436, and 438. Graph 432 depicts data for the northwest quadrant (380 shown in FIG. 17). Graph 434 depicts data for the northeast quadrant (382). Graph 436 depicts data for the southwest quadrant 384. Graph 438 depicts data for the southeast quadrant 438.

Combined data plot 428 depicts data for the entire sprinkler head management unit.

Each of the graphs 432, 434, 436, 438, and 428 depicts several different data sets to show the variation of the values as a function of distance away from the sprinkler head. In the illustrated embodiment, the graphs include soil moisture, compaction, and turf quality as normalized values.

The graphs permit the data to be quickly visualized.

In the example graph 438, no values are shown because, in this example, the sprinkler head was positioned along a southeast boundary of the turf site. As a result, no data was collected southeast of the sprinkler head.

FIG. 20 is a second portion of the example audit report shown in FIG. 19. In this example, the audit report further includes a graph 440. The graph 440 shows average soil moisture, as well as average moisture in each direction moving away from the head. The graph 440 further identifies the maximum directional variation value (e.g., 23.6%).

Figure 21:
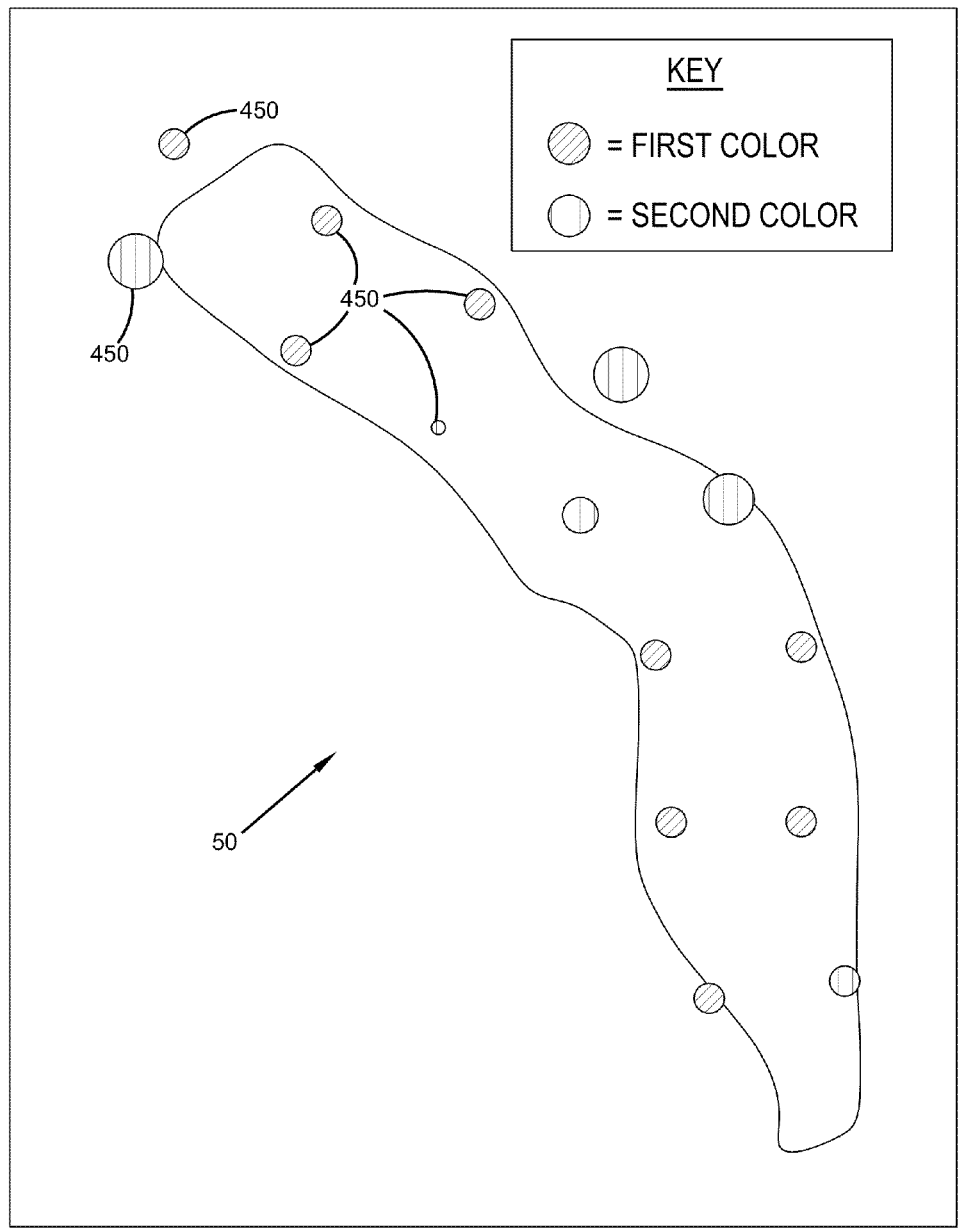
FIG. 21 illustrates another example of an audit report generated by the irrigation auditing system shown in FIG. 1.

FIG. 21 illustrates another example of an audit report 108. In this example, the audit report includes a graphical display of the turf site 50 (or a portion of the turf site, such as the fairway shown in FIG. 21) and locations of the sprinkler heads. Each sprinkler head that has been identified as a potentially underperforming sprinkler head is flagged. For example, each sprinkler head is identified with a graphical element 450. Sprinkler heads having a high score are depicted by a graphical element having a first color (e.g., green), while sprinkler heads having a low score are depicted by a graphical element having a second color (e.g., red). Further, in some embodiments the graphical element is sized representative of one or more characteristics of the sprinkler head, such based on the score of the sprinkler head. For example, a sprinkler head having a lower score is sized larger than a sprinkler head having a higher score. The display permits quick visualization and identification of the underperforming sprinkler heads. In some embodiments, the graphical elements can be selected to display the individual sprinkler head report as illustrated in FIGS. 20 and 21.

In some embodiments, additional information can also be included. For example, a graphical representation of soil moisture values can be displayed using colors to represent ranges of values. As another example, a lowest quartile plot of the soil moisture values is displayed, in which the driest areas of the turf site are depicted in one color, and the other areas are depicted in another color. This permits a quick comparison of the locations of dry spots on the turf site 50 with the locations of the sprinkler heads. Compaction and/or turf quality values can be similarly displayed.

A wide variety of alternative reports can be generated, including any of the information or data, or combinations of information or data described herein, and displayed in any desired form including numerical display, graphical display, electronic display on a computing device, and the like.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of evaluating irrigation system performance, the irrigation system including sprinkler heads, the method comprising:
   collecting data about a turf site, the data including soil moisture data, turf quality data, soil compaction data, and sprinkler head location data;
   generating, using at least one computing device, a performance score for the individual sprinkler heads using a computing device, the performance score being based at least in part on the soil moisture data, turf quality data, and soil compaction data for a region of the turf site surrounding the respective sprinkler head; and
   displaying, using the at least one computing device, the performance scores for the sprinkler heads to identify one or more of the sprinkler heads as potentially underperforming using the performance scores for the sprinkler heads.

2. The method of claim 1, wherein collecting data comprises measuring the data at the turf site using a mobile data collection vehicle.

3. The method of claim 1, wherein the region of the turf site is a portion of the turf site that is within a predetermined distance from the respective sprinkler head.

4. The method of claim 1, wherein generating a performance score comprises evaluating a soil moisture uniformity for the region, evaluating a soil moisture distribution pattern and magnitude for the region, and evaluating a directional variation for the region.

5. The method of claim 4, wherein generating a performance score further comprises evaluating turf quality within the region, and evaluating soil compaction within the region.

6. The method of claim 1, wherein generating a performance score further comprises performing a directional variation analysis by dividing the region into a plurality of concentric circles surrounding the respective sprinkler head, further dividing the region into quadrants having boundaries in the compass directions of North, South, West, and East, and evaluating at least one characteristic of the turf site within the concentric circles and within the quadrants.

7. The method of claim 1, wherein the performance score is reduced for the following: low soil moisture uniformity, high soil moisture distribution magnitude, high directional variation, high correlation between turf quality and soil moisture, and high correlation between soil compaction and soil moisture, wherein high and low are determined by comparison with threshold values.

8. A method of computing a performance of a sprinkler head, the method comprising:
- evaluating soil moisture uniformity in turf around the sprinkler head;
- evaluating turf quality of the turf around the sprinkler head;
- evaluating compaction of the turf around the sprinkler head;
- determining, using at least one computing device, a performance of the sprinkler head, using a computing device, based at least in part on the soil moisture uniformity, turf quality, and compaction; and
- generating, using the at least one computing device, an output configured to be used to control the sprinkler head, the output including information about the performance of the sprinkler head.

9. The method of claim 8, further comprising evaluating soil moisture directional variability in turf around the sprinkler head, wherein determining the performance of the sprinkler head is further based at least in part on the soil moisture directional variability.

10. A method of evaluating a performance of a sprinkler head, the method comprising:
- computing a soil moisture uniformity value, using a computing device, by evaluating a plurality of soil moisture values measured from a region of turf that is watered by the sprinkler head, wherein the moisture values represent a measurement of an amount of water in the soil at the time of the sampling;
- generating a score representative of the performance of the sprinkler head using at least the soil moisture uniformity value; and
- generating, using the computing device, an output configured to be used to control the sprinkler head, the output including the score representative of the performance of the sprinkler head.

11. A data processing lab, comprising:
- programmable electronics including at least one processing device and at least one computer readable storage medium, the at least one computer readable storage medium storing therein data instructions, which when executed by the at least one processing device cause the programmable electronics to:
- identify at least one location of a sprinkler head;
- evaluate at least one characteristic of a portion of a turf site surrounding the sprinkler head location using at least soil moisture data;
- determine whether the at least one characteristic indicates that the sprinkler head is underperforming; and
- generate an output configured to be used to control the sprinkler head, the output including the determination of whether the at least one characteristic indicates that the sprinkler head is underperforming.

12. The data processing lab of claim 11, wherein the evaluation of at least one characteristic is selected from the group consisting of: soil moisture uniformity, soil moisture distribution pattern, soil moisture distribution pattern magnitude, directional variation, turf quality, soil compaction, and soil salinity.

13. The data processing lab of claim 11, wherein the programmable electronics repeat the identification, evaluation, and determination steps for a plurality of sprinkler heads at the turf site to identify a set of the plurality of sprinkler heads that are underperforming.

14. A method of evaluating a sprinkler head distribution pattern, the method comprising:
- identifying a portion of a turf site surrounding a sprinkler head;
- segmenting the portion into multiple concentric bands extending from a location of the sprinkler head;
- evaluating at least one characteristic of the turf site within each of the concentric bands using a computing device;
- comparing the characteristics among the concentric bands; and
- generating an output configured to be used to control the sprinkler head, the output including the comparison of the characteristics among the concentric bands.

15. The method of claim 14, wherein evaluating the at least one characteristic comprises assigning a value to each of the concentric bands based at least in part on the at least one characteristic.

16. The method of claim 15, wherein the value is the computed average volumetric water content of the turf site within the portion of the turf site that is within the concentric band.

17. The method of claim 16, comparing the characteristics comprises assigning a score to each of the concentric bands by comparing the concentric band to an adjacent concentric band.

18. The method of claim 17, wherein the score is: (i) 0 if the value assigned to the concentric band is equal to the value assigned to the adjacent concentric band, or if the concentric band is the innermost concentric band; (ii) +1 if the value assigned to the concentric band is greater than the value assigned to the adjacent concentric band; and (iii) −1 if the value assigned to the concentric band is less than the value assigned to the adjacent concentric band.

19. The method of claim 18, wherein comparing the characteristics among the concentric bands further comprises generating a plot shape diagram, the plot shape diagram graphically illustrating the differences between the values assigned to the concentric bands.

20. The method of claim 19, further comprising identifying the pattern shape as one of a set of predefined pattern shapes.

* * * * *